US007962655B2

(12) United States Patent
Birger et al.

(10) Patent No.: US 7,962,655 B2
(45) Date of Patent: Jun. 14, 2011

(54) USING AN IDENTITY-BASED COMMUNICATION LAYER FOR COMPUTING DEVICE COMMUNICATION

(75) Inventors: Chet Birger, Lexington, MA (US); David C. Douglas, Concord, MA (US); Steven Rosenthal, Lexington, MA (US); Kenneth R. Traub, Lexington, MA (US)

(73) Assignee: Oracle International Corporation, Redwood Shores, CA (US)

( * ) Notice: Subject to any disclaimer, the term of this patent is extended or adjusted under 35 U.S.C. 154(b) by 2364 days.

(21) Appl. No.: 10/372,399

(22) Filed: Feb. 25, 2003

(65) Prior Publication Data
US 2009/0006840 A1    Jan. 1, 2009

Related U.S. Application Data

(60) Provisional application No. 60/398,722, filed on Jul. 29, 2002, provisional application No. 60/421,803, filed on Oct. 29, 2002.

(51) Int. Cl.
*G06F 15/16* (2006.01)
(52) U.S. Cl. .................................. 709/250; 713/151
(58) Field of Classification Search .................. 709/201, 709/223, 227, 232, 313, 230, 245; 370/522
See application file for complete search history.

(56) References Cited

U.S. PATENT DOCUMENTS

| 5,517,622 | A | * | 5/1996 | Ivanoff et al. ................. 709/232 |
| 5,548,633 | A | | 8/1996 | Kujawa |
| 5,710,908 | A | * | 1/1998 | Man .............................. 709/230 |
| 5,933,498 | A | | 8/1999 | Schneck et al. |
| 6,076,168 | A | | 6/2000 | Fiveash et al. |
| 6,145,084 | A | | 11/2000 | Zuili et al. |
| 6,157,648 | A | | 12/2000 | Voit et al. |
| 6,167,449 | A | * | 12/2000 | Arnold et al. ................. 709/227 |
| 6,363,495 | B1 | | 3/2002 | MacKenzie et al. |
| 6,374,298 | B2 | | 4/2002 | Tanno |
| 6,490,679 | B1 | | 12/2002 | Tumblin et al. |
| 6,523,696 | B1 | * | 2/2003 | Saito et al. ..................... 709/223 |
| 6,587,874 | B1 | | 7/2003 | Golla et al. |
| 6,587,875 | B1 | | 7/2003 | Ogus |
| 6,611,863 | B1 | | 8/2003 | Banginwar |
| 6,671,273 | B1 | | 12/2003 | Beck |
| 6,678,827 | B1 | | 1/2004 | Rothermel et al. |
| 6,725,376 | B1 | | 4/2004 | Sasmazel et al. |
| 6,742,114 | B1 | | 5/2004 | Carter et al. |
| 6,763,040 | B1 | | 7/2004 | Hite |
| 6,782,474 | B1 | | 8/2004 | Ylonen |

(Continued)

OTHER PUBLICATIONS

Kohl, J., and Neuman, C., "The Kerberos Network Authentication Service (V5)," The Internet Engineering Task Force, Network Working Group, Sep. 1993, 105 pgs.

(Continued)

*Primary Examiner* — Dustin Nguyen
(74) *Attorney, Agent, or Firm* — Squire, Sanders & Dempsey (US) LLP

(57) ABSTRACT

A computer architecture for enterprise device applications provides a real-time, bi-directional communication layer for device communication. An identity-based communications layer provides for secure, end-to-end telemetry and control communications by enabling mutual authentication and encryption between the devices and the enterprise. The identity-based communications layer is situated between a network layer and an application layer and transmits a message between two devices identified by a global address. The global address specifies a protocol, a network, and an address meaningful for the combination of the protocol and the network.

56 Claims, 15 Drawing Sheets

U.S. PATENT DOCUMENTS

| | | |
|---|---|---|
| 6,788,648 B1 | 9/2004 | Peterson |
| 6,792,534 B2 | 9/2004 | Medvinsky |
| 6,823,454 B1 | 11/2004 | Hind et al. |
| 6,836,806 B1 * | 12/2004 | Raciborski et al. ........... 709/245 |
| 6,842,789 B1 | 1/2005 | Nazari |
| 6,874,012 B1 | 3/2005 | St. Pierre |
| 6,915,437 B2 | 7/2005 | Swander et al. |
| 6,925,087 B2 | 8/2005 | Inoue |
| 6,925,105 B1 | 8/2005 | Partyka |
| 6,931,529 B2 | 8/2005 | Kunzinger |
| 6,957,066 B1 | 10/2005 | Stammers et al. |
| 6,959,339 B1 | 10/2005 | Wu et al. |
| 6,973,070 B1 | 12/2005 | Larghi |
| 6,973,506 B2 | 12/2005 | Ishiyama et al. |
| 6,985,953 B1 | 1/2006 | Sandhu et al. |
| 6,986,061 B1 | 1/2006 | Kunzinger |
| 6,999,452 B1 | 2/2006 | Drummond |
| 7,024,156 B2 | 4/2006 | Kawamata |
| 7,069,438 B2 | 6/2006 | Balabine et al. |
| 7,082,200 B2 | 7/2006 | Aboba et al. |
| 7,093,000 B1 | 8/2006 | Yamagishi et al. |
| 7,095,855 B1 | 8/2006 | Collins |
| 7,113,994 B1 | 9/2006 | Swift et al. |
| 7,177,917 B2 | 2/2007 | Giotta |
| 7,181,620 B1 | 2/2007 | Hur |
| 7,200,865 B1 | 4/2007 | Roscoe |
| 7,224,713 B2 | 5/2007 | Partyka |
| 7,234,058 B1 | 6/2007 | Baugher et al. |
| 7,260,638 B2 | 8/2007 | Crosbie |
| 7,310,331 B2 | 12/2007 | Sjoblom |
| 7,310,356 B2 * | 12/2007 | Abdo et al. ................... 370/522 |
| 7,356,711 B1 | 4/2008 | Calinov et al. |
| 7,359,704 B1 | 4/2008 | Dizdarevic |
| 7,412,598 B1 | 8/2008 | Gleichauf |
| 7,533,164 B2 * | 5/2009 | Volz et al. ..................... 709/223 |
| 2001/0014917 A1 | 8/2001 | Ishiyama |
| 2001/0047484 A1 | 11/2001 | Medvinsky et al. |
| 2001/0049729 A1 | 12/2001 | Carolan et al. |
| 2002/0083008 A1 | 6/2002 | Smith |
| 2002/0116637 A1 | 8/2002 | Deitsch et al. |
| 2002/0150253 A1 | 10/2002 | Brezak et al. |
| 2002/0156879 A1 | 10/2002 | Delany et al. |
| 2002/0188657 A1 * | 12/2002 | Traversat et al. ............. 709/201 |
| 2003/0033518 A1 | 2/2003 | Faccin et al. |
| 2003/0101284 A1 * | 5/2003 | Cabrera et al. ................ 709/313 |
| 2003/0149871 A1 | 8/2003 | Medvinsky |
| 2003/0198219 A1 | 10/2003 | Coggeshall |
| 2003/0217288 A1 | 11/2003 | Guo et al. |
| 2003/0217289 A1 | 11/2003 | Ammon et al. |
| 2004/0010687 A1 | 1/2004 | Futa et al. |
| 2004/0039905 A1 | 2/2004 | Leoutsarakos |
| 2004/0078571 A1 | 4/2004 | Haverinen |
| 2005/0144074 A1 | 6/2005 | Fredregill et al. |
| 2005/0182675 A1 | 8/2005 | Huettner |

OTHER PUBLICATIONS

U.S. Appl. No. 10/372,395, which is titled Computer System; filed Feb. 25, 2003.

U.S. Appl. No. 10/372,398, which is titled Identifying a Computing Device; filed Feb. 25, 2003.

U.S. Appl. No. 10/372,397, which is titled, A Computer System for Authenticating a Computing Device; filed Feb. 25, 2003.

Ken Hornstein; "Kerberos Protocol"; http://www.nrl.navy.mil/CCS/people/kenh/kerberos-faq.html; Jul. 1, 2010.

U.S. Appl. No. 11/354,819, Non-final Office Action issued Dec. 9, 2010.

* cited by examiner

USING AN IDENTITY-BASED COMMUNICATION LAYER FOR COMPUTING DEVICE COMMUNICATION

CROSS REFERENCE TO RELATED APPLICATIONS

This application claims priority from U.S. Provisional Application No. 60/398,722, titled "Computer System" and filed Jul. 29, 2002, and from U.S. Provisional Application No. 60/421,803, titled "Computer System" and filed Oct. 29, 2002, both of which are incorporated by reference in their entirety.

TECHNICAL FIELD

This description relates to computer systems.

BACKGROUND

Advances in computing and networking technologies are creating new waves of network-aware sensors, instruments, products and devices. These devices generally transmit status information and operating data, receive commands over a network, and may be referred to as telemetric devices. By some estimates, there may be 10,000 of these telemetric devices for every human being on the planet by the year 2010. Enterprises are attempting to leverage the use of these devices by deploying device computing applications to more efficiently measure, monitor, maintain and control processes and equipment. In some cases, a geographically distributed enterprise may use a device computing application to increase the enterprise's reach beyond the traditional networks of the enterprise. This may result in market growth and cost savings for the enterprise.

SUMMARY

In one general aspect, a first endpoint connected to a network uses a global address of a second endpoint connected to the network to communicate with the second endpoint. The global address specifies a protocol, a network identifier, and an address meaningful for the combination of the protocol and a network identified by the network identifier. An application sends messages directed to the second endpoint through an identity-based communication layer that is situated between a network layer and an application layer. The messages are independent of the protocol. The identity-based communication layer transmits the messages to the second endpoint using the protocol, the network, and the address specified by the global address.

Implementations may include one or more of the following features. For example, the global address of the second endpoint may be determined by using a unique identity identifier associated with the second endpoint. The global address may be different each time a session is initiated with the second endpoint. The identity identifier may specify a realm and a unique identifier that identifies the second endpoint within the realm. The combination of the realm and the unique identifier may uniquely identify the identity.

The identity identifier may be an identity identifier for a composite identity that is associated with two or more other identity identifiers. The composite identity may be associated with an authentication credential. The composite identity may be created only when each of the two or more other identity identifiers associated with the composite identity have been authenticated. At least one of the two or more other identity identifiers may be an identity identifier for another composite identity. The determination of the global address may be accomplished through the use of a presence and availability service that provides the global address in response to a received identity identifier.

The second endpoint may announce the global address of the second endpoint through the use of the presence and availability service. A determination may be made as to whether the second endpoint is permitted to announce the global address. The second endpoint may announce the global address through the use of the presence and availability service only when the second endpoint is permitted to announce the global address. The determination as to whether the second endpoint is permitted to announce the global address may be based on the identity identifier of the second endpoint. The determination as to whether the second endpoint is permitted to announce the global address may be performed by a policy service. The global address provided by the presence and availability service in response to an identity identifier may be the global address most recently announced by the endpoint associated with that identity identifier. The determination of the global address of the second endpoint may occur during an authentication procedure involving the first endpoint, the second endpoint and a third entity.

The determination may be made as to whether a communication session between the second endpoint and a first endpoint is permitted. The authentication procedure may be completed only when the communication session is permitted. The determination may be based on the identity identifier of at least one of the second endpoint and the first endpoint. The determination as to whether the communication session is permitted may be performed by a policy service.

The messages exchanged in the communication session between the first endpoint and the second endpoint may be encrypted. A policy service may determine whether to encrypt messages exchanged in the communication session between the first endpoint and the second endpoint. The determination as to whether to encrypt messages may occur when the first endpoint initiates a communication session with the second endpoint or may be based on the identity identifier of at least one of the first endpoint and the second endpoint. The determination as to whether to encrypt messages may occur during an authentication procedure involving the first endpoint, the second endpoint, and a third entity.

An integrity check may be applied to a message exchanged in the communication session between the first endpoint and the second endpoint. The integrity check nay employ a message authentication code. A policy service may determine whether to apply integrity checks to messages exchanged in the communication session between the first endpoint and the second endpoint.

The determination as to whether to apply data integrity checks may occur when the first endpoint initiates a communication session with the second endpoint, may be based on the identity identifier of at least one of the first endpoint and the second endpoint, or may occur during an authentication procedure involving the first endpoint, the second endpoint, and a third entity.

The first endpoint may be connected to a first network. The second endpoint may be connected to a second network. A relay may be used to connect the first network and the second network.

The protocol may be a message-framing protocol using the transmission control protocol. The address meaningful for the combination of the protocol and the network identified by the network identifier may be an Internet Protocol address and a transmission control protocol port number. The address meaningful for the combination of the protocol and the network identified by the network identifier may be an Internet Protocol domain name and a transmission control protocol port number. The protocol may be the Hypertext Transfer Protocol. The address meaningful for the combination of the protocol and the network identified by the network identifier may be a uniform resource locator.

The identity identifier of the second endpoint may be associated with more than one global address. The global address may be selected from the more than one global address associated with the identity identifier of the second endpoint to use for communicating between the first endpoint and the second endpoint.

In another general aspect, two endpoints connected to a network may communicate. An application of a first endpoint provides to a global-address-based communication layer a message destined for a second endpoint and a global address of the second endpoint. The global address specifies a protocol, a network identifier, and an address meaningful for the combination of the protocol and a network identified by the network identifier. The global-address-based communication layer selects an appropriate networking layer. The global-address-based communication layer provides to the selected networking layer the message destined for the second endpoint and the address meaningful for the combination of the protocol and network identified by the network identifier. The selected networking layer sends the message to the second endpoint.

Implementations may include one or more of the features noted above and one or more of the following features. For example, the selected networking layer may transmit the message using the protocol specified by the global address of the second endpoint.

The application may provide to an identity-based communication layer a message destined for the second endpoint and an identity identifier associated with the second endpoint. The identity-based communication layer may use a presence and availability service to determine the global address of the second endpoint using the identity identifier associated with the second endpoint. The identity-based communication layer may provide to the global-address-based communications layer the message destined for the second endpoint and the global address of the second endpoint.

The presence and availability service may be used to determine the global address of the second endpoint. The global address may be sent to the presence and availability service the identity identifier associated with the second endpoint. The global address associated with the second endpoint may be received from the presence and availability service.

A networking layer of the second endpoint may receive the message and provide the message to a global-address-based communication layer of the second endpoint. The global-address-based communication layer of the second endpoint may provide the message to an application layer of the second endpoint.

The message may be provided to the application layer of the second endpoint by having the global-address-based communication layer of the second endpoint provide the message to an identity-based communication layer of the second endpoint. The identity-based communication layer of the second endpoint may provide the message to the application layer of the second endpoint.

Implementations of the techniques discussed above may include a method or process, a system or apparatus, or computer software on a computer-accessible medium. The details of one or more of the implementations are set forth in the accompanying drawings and description below. Other features will be apparent from the description and drawings, and from the claims.

DESCRIPTION OF DRAWINGS

Like reference symbols in the various drawings indicate like elements.

DETAILED DESCRIPTION

Figure 1:
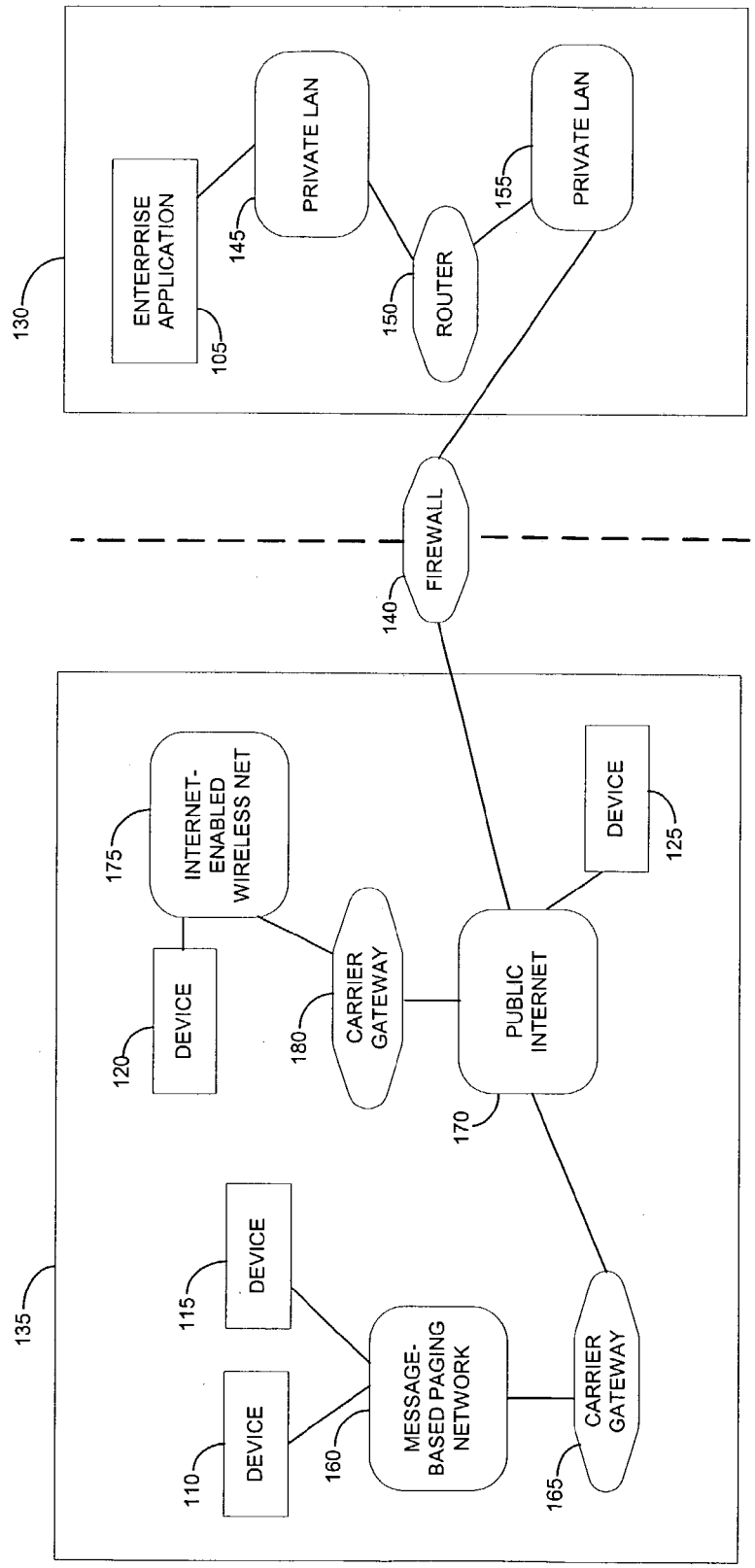
FIG. 1 is a block diagram of a computer system that implements an enterprise device application.

In one particular implementation, a system architecture is provided to support the deployment of network devices, which may range from simple temperature or vibration sensors to more complex servers or manufacturing test equipment. The architecture supports real-time telemetry and control information about the devices to enable a new class of applications, which may be referred to as device computing applications or device applications. Options provided by such applications may include providing new levels of responsiveness for preventative maintenance of devices before emergencies arise, offering new services such as advanced support programs and pay-per-use billing models to customers by continuously monitoring devices and the methods and frequencies by which the devices are used, reducing costs through unattended remote control and maintenance of devices, and automating business transactions by integrating devices directly with back-end enterprise software suites to eliminate error-prone manual and paper-based processes.

Through the deployment of device applications, enterprises may access valuable information that provides unique, real-time visibility into all aspects of enterprise operations. Enterprises may use this information to provide better service with better quality support and quicker, if not immediate, responses to device issues that arise. Furthermore, business process efficiencies may be realized through the deployment of devices.

The system architecture provides a single, consistent platform that may be used across all enterprise device application projects. The architecture provides a real-time, bi-directional communication layer for all device communication needs, as well as a comprehensive platform upon which robust device applications may be quickly and efficiently developed and deployed.

The system architecture provides a platform for fully secure, end-to-end telemetry and control communications, by enabling mutual authentication and encryption between the device and the enterprise. Using an Identity-based Communications Layer (ICL), the system architecture assigns a unique identity to every device, user and application, and provides a full suite of security services including authentication, access control, encryption and data integrity.

The ICL operates above the network communication layer to enable secure device-to-enterprise communication over any network type. Networks such as paging networks, satellite networks, cellular networks, and proprietary data networks (e.g., a wireless protocol from a device to a base station) are supported.

The system architecture provides for remote, centralized management and policy control of all devices on the network. The system architecture is also highly scalable.

The system architecture provides a single and consistent infrastructure that allows the same platform to be used for all of an enterprise's device applications. Common processing modules also may be shared among these applications to significantly reduce both development and deployment costs. The enterprise benefits from incorporating various telemetry and control information from different sources. The system architecture promotes interoperability between projects by easily combining and distributing this data to any authorized person or department within the enterprise. Furthermore, application management and policy control (e.g., for security settings) may be centrally and consistently administered for all applications.

The system architecture provides a device computing enterprise platform and an identity-based communication layer (ICL) that may be used to rapidly develop device applications for all types of devices.

The device computing platform manages real-time data flows associated with devices. Typically, incoming device data needs to be refined or inspected, such as by using checksums, computational transformations, filtering, parsing, database writing or re-formatting of the data. Device applications may use common methods to process the device data into useful information. For example, simple checks may be incorporated to ensure that the incoming data represents reliable data and falls between expected ranges; alerts and notifications may be triggered at different points along the processing chain if the data is revealed to violate some predefined policies; different data streams may be correlated to ensure that the specific data from one device is matched up against the corresponding data from another device; transactions may be initiated based upon various preset rules and incoming data flows; and, at various points along the flow of device data, at least some portion of the information may be stored in a database. The system architecture leverages these similarities and presents an environment upon which the developer can assemble and configure existing information flow processing modules to accomplish developer needs.

The system architecture provides developers with a platform for simply configuring pre-defined flow processors that may accomplish a substantial portion of the device application development requirements. The time required for developing these applications may be reduced dramatically when compared with conventional approaches. The system architecture provides a robust architecture to ensure seamless, secure communications across any network, regardless of type or dispersion. A flow processor also may be reused in a different device application, which may result in further reductions of the time required to develop a device application.

Special processing of the information flows might be required to carry out application-specific processing with the incoming data. In these cases, the system architecture provides a template that the developer may use to create an information flow processor and incorporate the information flow processor into the device application.

The device computing platform may allow for efficient development of device applications and may limit the range of skills required by a developer. Furthermore, the applications that are developed can leverage the device computing platform to provide security, scalability, network independence, and an efficient installation.

The core of the computing device platform upon which the device applications run (i.e., the application run-time environment) uses the ICL to enable the secure, bi-directional communications among devices, and between devices and the enterprise. The ICL may extend to the device. A unique identity may be permanently assigned to every entity within the communications flow, including the device, the user, and the application. The identity may enhance the scalability, security and network independence of a device application.

The ICL helps to ensure that devices and users are authenticated and authorized, and that communication messages are encrypted to maintain their integrity. The ICL operates above the networking protocol layer to allow communications to occur over any type of data network. Furthermore, the applications using the ICL are unaffected by changes in routing processes or IP addresses (e.g., during a system upgrade or otherwise).

An application developed on the device computing platform communicates with devices on the network through the ICL. Additional applications may be developed to further process the device information in a secure and scalable fashion.

The ICL provides a mediated peer-to-peer model that supports communications between two entities. According to the model, a first entity A invokes core services (e.g., authentication services) of the ICL to communicate with a second entity B. Entities A and B are named by identities that are independent of underlying network hardware and software, and that are automatically translated into network addresses. In particular, each of entities A and B may have one or more associated global addresses that include a network identifier, a protocol identifier, and a network address meaningful to the identified network.

Applications in which the system architecture may be employed include, for example, use by product manufacturers (e.g., manufacturers of computers, network equipment, vehicles or other machines, building controls, medical devices, machine tools, appliances, and electrical infrastructure such as generators) to monitor product performance. Networks that may be employed in such applications include dial-up networks, the Internet, wireless networks, and customer networks that may or may not be isolated by firewalls. Particular services that may be provided by such applications may include remote health monitoring, remote service, condition-based maintenance, pay per use monitoring, value-added services, and supply replenishment.

Another application of the system architecture is with respect to highly distributed operations within one company. Example devices that may be encompassed by such an application include a sensor, a personal digital assistant (PDA), a mobile telephone, a controller, network-enabled equipment, a truck, a global positioning satellite (GPS) receiver, a bar code or radio frequency identification (RFID) scanner, a cash register, and a customer kiosk. Networks that may be encountered include, for example, the Internet, wireless networks (e.g., paging, cellular or satellite), Internet plus dial-up, Internet plus a digital subscriber line (DSL), and Internet plus a local area network (LAN). Services provided by a highly distributed application include logistics, asset tracking, asset optimization, supply chain management, inventory management, business intelligence, and real-time business transactions.

Referring to FIG. 1, a computer system 100 controls communications between an enterprise application 105 and devices 110, 115, 120 and 125. The enterprise application 105 is located on an enterprise side 130 of the computer system, while the devices 110, 115, 120 and 125 are located on a device side 135 of the computer system. A firewall 140 isolates the enterprise side 130 from the device side 135.

In the illustrated implementation, the enterprise application 105 reaches the firewall 140 through a first private LAN 145, a router 150, and a second private LAN 155. The devices 110 and 115 reach the firewall 140 through a message-based paging network 160 that is connected through a carrier gateway 165 to the public Internet 170, which is connected to the firewall 140. The device 120 is connected to the Internet 170 through an Internet-enabled wireless network 175 and a carrier gateway 180, while the device 125 is connected directly to the Internet 170.

The computer system employs a system architecture that facilitates connections between business information technology infrastructure (i.e., the enterprise application 105) and devices of all kinds. Devices may include, for example, objects and equipment that are involved in the operation of a business, such as appliances, electronic equipment, factory machines, gas pumps, office equipment, thermostats, wireless phones, vehicles, or any other object that includes electronic components. The linking of devices on a wide-spread scale to the information technology infrastructure of a business may create new opportunities for cost saving, revenue opportunity, and/or customer satisfaction.

For example, in one implementation, the retail sales division of a large energy company may be able to monitor gas pumps and tanks at filling stations across the country. Fuel readings from the gas stations also may be correlated with readings from on-truck fuel level sensors and location tracking equipment. By gathering information in real time about which stations need fuel deliveries and identifying the closest truck with sufficient fuel, transportation cost savings may be realized.

In another example, a worldwide package delivery company employs a great diversity of devices in its daily operations: drivers carry handheld package scanners, delivery trucks are equipped with GPS-based location sensors, retail package drop-off centers have point-of-sale devices, and shipping rooms of catalog sales customers of the delivery company have specialized devices that automate the shipping and tracking of thousands of packages that each such customer ships daily. Managing all of these devices to provision new equipment, monitor sources of trouble, and insure that consistent corporate security policies are met may be exceedingly difficult. Having a uniform underlying network architecture can reduce the system administration burden by an order of magnitude, saving money while assuring that security goals are more reliably met.

In yet another example, a manufacturer of magnetic resonance imaging (MRI) equipment for medical diagnosis is able to monitor the operation of products installed at customer sites, as well as to remotely administer and control the products. By doing this, the manufacturer may realize substantial savings in the cost of customer service and may be able to provide a more rapid response to a customer's problem. The manufacturer also may create new usage-based sales models in which a customer pays a fee for each image produced by the MRI machine (e.g., pay "by the image") instead of purchasing the MRI machine from the manufacturer.

These examples illustrate both the variety of ways to connect enterprises to devices within the enterprise and the variety of business opportunities that may underlie the need for the described system architecture.

Figure 2:
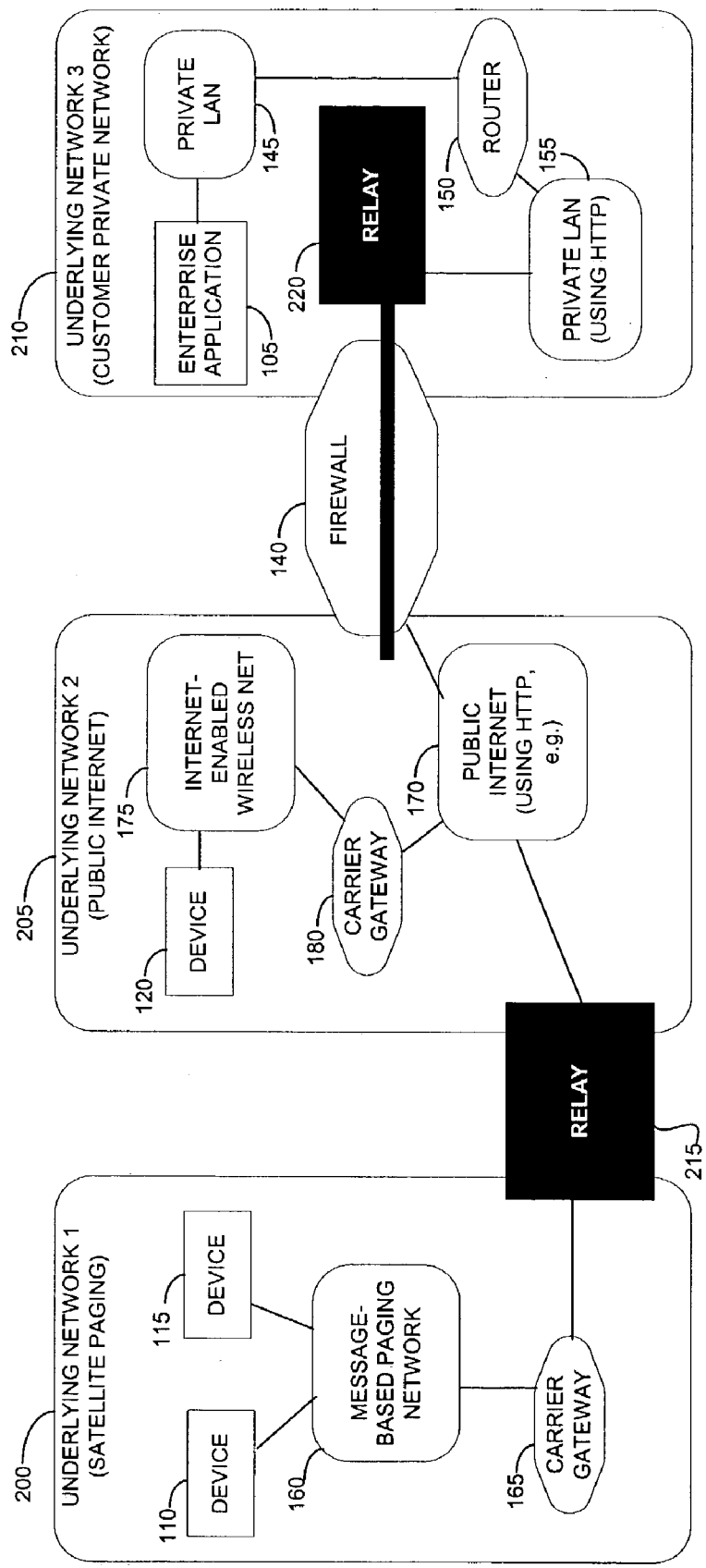
FIG. 2 is a block diagram of the computer system of FIG. 1 divided into underlying networks.

FIG. 2 illustrates that the system 100 of FIG. 1 may be divided into a first underlying network 200 that includes a satellite paging network, a second underlying network 205 that includes the public Internet, and a third underlying network 210 that includes private LANs. A relay 215 connects the first underlying network 200 to the second underlying network 205, and a relay 220 connects the second underlying network 205 to the third underlying network 210.

A relay, such as relay 215 or relay 220, is a special application that runs within the system 100. A relay bridges communication between different protocols or across networks that are not inter-addressable. A relay maintains routing information that indicates what adjacent relays should be used to reach an underlying network that is not directly reachable.

Deployments that do not require protocol or network bridging do not require a relay. The relay is like an ICL core service in that an ICL endpoint library relies on the relay for proper operation. But unlike the other ICL core services, the relay is not a required part of every deployment, and the relay is not necessarily hosted on the enterprise side, but rather at appropriate places according to physical network topology.

The boundaries of underlying networks occur where there is a fundamental barrier to native interconnection. One example would be a device "last hop" network that is based on a non-real-time messaging model, such as a short message service over a paging network. When it is not feasible or desirable to run IP on such a network, the "last hop" network cannot be seamlessly integrated into the public Internet. Instead, the "last hop" network would be a different underlying network from the public Internet. Another example occurs when a firewall separates otherwise compatible networks. For example, if an enterprise has a private Internet that is connected to the public Internet through a firewall, but the firewall configuration does not expose devices on the private network to the public network, then the private network is a separate underlying network.

Yet another example of a boundary between underlying networks occurs when different protocols are to be employed by different endpoints, such as, for example, when one endpoint wants to use hypertext transfer protocol (HTTP) but another wants to use the simple mail transfer protocol (SMTP). Though the endpoints are inter-addressable, they cannot communicate directly with each other.

In many applications, the public Internet as a whole is one of the underlying networks involved. If a company has private LAN segments that are connected to the public Internet in a way that permits free communication in both directions, then those LAN segments are part of the same underlying network as the public Internet. Likewise, if there are mobile devices that use the cellular telephone network through a carrier that provides IP connectivity to the public Internet, then the cellular telephone network is also part of the same underlying network.

Small to medium-sized deployments may have one underlying network that includes the public Internet and possibly some private Internet segments (suitably exposed by firewalls) and devices that can be assigned public IP addresses. No relays are required in that situation. On the other hand, a large-scale deployment may have three or four underlying networks, including, for example, the public Internet and devices that have public IP addresses; the enterprise's private Internet, shielded from the public Internet by firewalls, which may be physically composed from several disconnected private LANs that are bridged by virtual private network (VPN) technology through the public Internet but logically separate from the public Internet; and one or more non-IP last hop networks, such as a messaging-based paging network or a carrier-specific wireless network.

Figure 3:
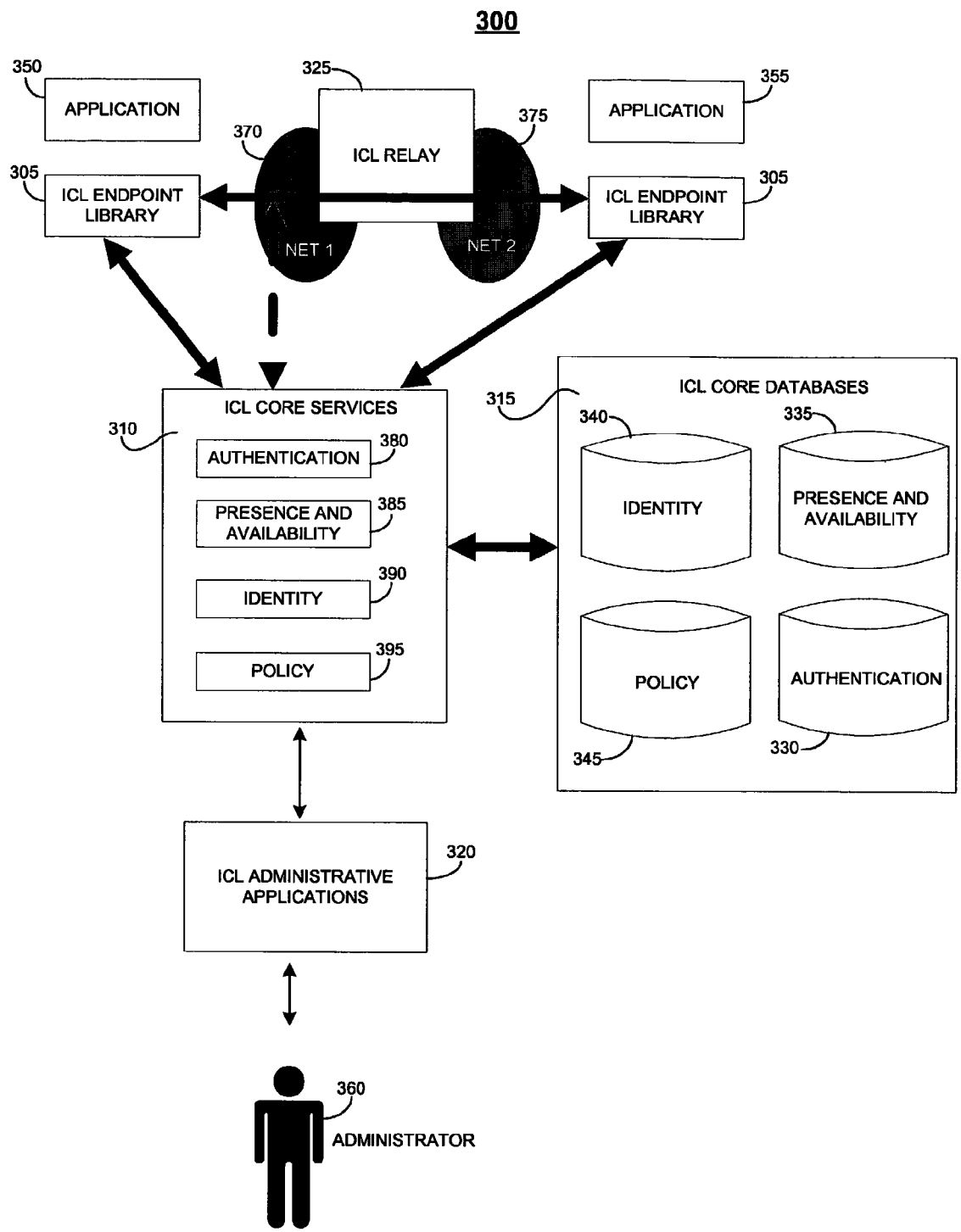
FIG. 3 is a block diagram illustrating a system architecture for providing an inter-communication layer for device information flows.

FIG. 3 illustrates a system architecture 300 that provides an identity-based communication layer (ICL). The ICL system architecture assigns a unique identity to every device, user and application, and provides security services, including authentication, access control, encryption and data integrity, to the identities within the system.

The ICL architecture 300 includes one or more ICL endpoint libraries 305, ICL core services 310, ICL core databases 315, ICL administrative applications 320, and one or more ICL relay nodes 325. The ICL endpoint libraries 305 are software libraries that may be deployed on devices and enterprise servers to provide an ICL application programming interface (API) to applications, such as applications 350 and 355. The ICL endpoint library 305 also may be used within an ICL relay node 325, and to host the ICL core services 310 and ICL administrative applications. 320. An endpoint is associated with a persistent identity, which, in turn, is associated with a network address. Examples of endpoints include a device, an enterprise server, and a user using a device.

The ICL endpoint libraries 305 provide the functionality needed by one endpoint to interact with another endpoint through the ICL. Each endpoint library includes the ICL API called by the application client code, service clients for ICL core services that are used within the ICL to carry out API operations, and plug-in points for network modules and security modules. An application may link directly with the ICL endpoint library. More commonly, an application may be written based on or using one or more information flow processors that are linked with the ICL endpoint library 305.

In some implementations, an ICL endpoint library may be developed for a particular computing environment. For example, a device-side endpoint library may be developed for an endpoint operating WinCE by Microsoft Corporation, another endpoint library may be developed for an endpoint operating an enterprise-side, single Java virtual machine (JVM) by Sun Microsystems, Inc., and yet another endpoint library may be developed for an endpoint that is an enterprise-side server operating Java 2 Platform Enterprise Edition (J2EE), by Sun Microsystems, Inc. The device-side libraries may provide fewer capabilities, particularly in the areas of dynamic management and scalability, than an enterprise-side library due to the reduced system capabilities of a device relative to the system capabilities of a server.

The ICL core services 310 are a set of autonomous software processes that interact with the rest of the system through communication channels to manage and mediate access to the ICL core databases 315. The ICL core services 310 include an authentication service 380, a presence and availability service 385, an identity service 390, and a policy service 395.

The authentication service 380 is responsible for verifying the credentials of identities and thereby providing authentication of endpoints as the endpoints register onto the system and as they establish communication sessions with other endpoints. The authentication service is also responsible for issuing new credentials and maintaining the information required to verify the credentials during authentication.

The presence and availability service 385 is responsible for maintaining the information that associates endpoint identities with the underlying network addresses that are used to establish communication sessions. The presence and availability service 385 also may maintain other availability information that endpoint identities may wish to advertise to other endpoint identities in the system.

The identity service 390 is responsible for managing the identities of devices and applications. Identities are authenticable, persistent names associated with endpoints that are independent of the physical addresses by which endpoints are connected to their underlying networks. The communications APIs exposed by the ICL operate in terms of identities, not addresses, which shields applications from changes in underlying network topology, issues of mobility, and the various addressing schemes employed by different underlying networks. The identity service also may maintain persistent information about identities in the form of attributes. In some implementations, the identity service 390 may provide version support and historical archiving. The identity service 390 also provides support for a composite identity, which is used to represent temporal associations between different kinds of identities (e.g., a specific user logged into a specific device).

The policy service 395 is responsible for maintaining policy rules and making policy decisions that arise in the operation of the ICL and the applications. ICL-specific policy decisions include authorization of endpoint registration, authorization of communication session establishment, security settings and network selection for communication session establishment, and authorization of identity creation. Applications may also use the policy service for application-specific purposes.

The ICL endpoint libraries 305 rely on the ICL core services 310 to carry out most of the functions of the API. Most activities carried out by the ICL administrative applications 320 also interact with ICL core services 310. Every complete installation of the ICL deploys ICL core services 310 in some location. Typically, ICL core services 310 are deployed on centralized servers within the enterprise.

The ICL core databases 315 maintain information about the current state of the system, persistent information configured through administrative activity, and historical archives of the other data. The ICL core databases provide a basis for centralized control and management. The centralized control and management is advantageous when a device application is used for a large and/or a widely-dispersed group of devices.

The ICL core databases 315 include an authentication database 330, a presence and availability database 335, an identity database 340, and a policy database 345. The presence and availability database 335 also may be referred to as a presence and availability management (PAM) database 335. The ICL core databases 315 correspond to ICL core services 310. In some implementations, other data management techniques may be used in which a core service does not necessarily correspond to a core database.

The authentication database 330 stores information that allows identity credentials to be verified. The PAM database 335 stores information about the current presence and availability status of ICL endpoint identities. The PAM database 335 also maintains the association between identities and underlying network addresses. The identity database 340 stores descriptive information about identities in the system, including an unchanging identifier that is unique both across all identities within the enterprise and across all enterprises. The identity database 340 also stores an identifier that is unique within a hierarchical namespace for the enterprise and is changeable. The identity database 340 also stores attributes associated with the identity. The policy database 345 stores rules that govern policy decisions that control most ICL activity and application activity.

In some instances, a historical archive is kept that records the evolution of one or more of the ICL core databases 315 over time. This may be used by applications that preserve application data in order to correlate old data with the administrative state of the system at the time of data collection.

The ICL administrative applications 320 are one or more software applications that permit administrators to interact with ICL core services 310 to control the behavior of all devices and applications that use ICL.

The ICL relay nodes 325 bridge underlying networks 370 and 375. The ICL relay nodes 325 are autonomous software processes deployed on servers within the interior of the network to bridge between different underlying networks and protocols. The deployment of relay nodes, including the number and location of deployed relay nodes, is a function of network topology and customer networking requirements. In many instances, a customer will have a single underlying network such that ICL relay nodes are not required.

Applications 350 and 355 and administrator 360 are outside the ICL system but interact with the ICL system. An application, such as application 350 and application 355, is software that interacts with the ICL but is not provided by the ICL itself. Applications include software created by end-users and software not identified as part of the ICL. Applications primarily interact with each other by communicating through the API exposed by the ICL endpoint library. These interactions are mediated by the ICL core services, which in turn rely on data maintained in the ICL core databases.

An administrator 360 is a human responsible for operating or maintaining the ICL within the context of an enterprise's business operations. Administrators primarily interact with the ICL administrative applications to manipulate the state maintained in the ICL core databases. Because these databases ultimately mediate application interactions, administrators have ultimate control over all application interactions.

Activity within the ICL may include application-initiated activities and administrator-initiated activities. Application-initiated activities are those activities which are initiated by an application to use the ICL API to perform application functions. Examples include registration activity, ICL session activity, composite identity activity, and renewal and revocation activity. Most application-initiated activities may occur without intervention by a human administrator.

In registration activity, an identity held by a device or an enterprise application is announced to the system, and the system permits the holder (e.g., the device or the enterprise application) to initiate or accept ICL communication sessions. The announcement establishes the association between the identity and the underlying network address within the presence and availability management database. Policies from the policy database control whether a registration is permitted. The registering of an identity's credential is verified using information in the authentication database.

In ICL session activity, the holder of an identity establishes a communication channel to another identity and exchanges data using the communication channel. The authentication service, using information in the authentication database, provides bi-directional authentication to both parties. The presence and availability management database is consulted to translate the remote identity into its corresponding underlying network address. The identity database may be consulted to look up and translate identity names. Policies from the policy database control the authorization of whether the session is permitted and the parameters that determine the level of security to be employed during data exchange.

In composite identity activity, the holder of a physical identity creates a new identity by combining the physical identity with one or more virtual identities for which the holder can provide verification of credentials. A composite identity might arise, for example, if a user logs into a device and a composite identity representing that user as logged into that device is created.

In renewal and revocation activities, for each of the application-initiated activities above, artifacts that have limited lifetime (e.g., a registration that is valid only for a period of time) or which change (e.g., if a mobile device changes its underlying network address) are renewed, and artifacts created by prior activity are explicitly destroyed.

Administrator-initiated activities take place primarily through the ICL administrative applications, under the control of a human administrator (or perhaps a script created by an administrator). These activities largely entail interacting with ICL core services to modify and report on the contents of the databases maintained by the ICL core services. Administrator-initiated activities include identity management, policy management, and system monitoring.

Identity management involves creating, modifying, and deleting identities for devices, users, and applications, organizing identities to reflect business decisions and processes, tracking and reporting on existing identities, establishing and revoking authentication credentials for identities, and imprinting new device identities into devices.

Policy management involves creating, modifying, and deleting policy rules that control the behavior of the ICL (which in turn governs how devices and applications interact).

System monitoring involves tracking and reporting on the current status of devices and communications within the system.

The ICL layer of the architecture addresses networking and communication requirements that are common to most enterprise device applications. The ICL operates by enhancing underlying network APIs to provide a higher-level API to applications. In particular, the ICL adds functionality in the areas of identity, security, management/policy, and network and protocol bridging.

As to identity, the ICL manages identities of devices and applications. Identities are authenticable, persistent names associated with endpoints that are independent of the physical addresses by which endpoints are connected to their underlying networks. The communications APIs exposed by the ICL operate in terms of identities, not addresses, which shields applications from changes in underlying network topology, issues of mobility, and the various addressing schemes employed by different underlying networks. The identity service also maintains more persistent information about identities in the form of attributes, with full versioning and historical archives. The identity system includes a very powerful notion of composite identity that is used to represent temporal associations between different kinds of identity (e.g., a specific user logged into a specific device).

As to security, the ICL provides end-to-end security services for communications. When communication between two endpoints is established, a bi-directional authentication verifies each endpoint's identity to the other. Communication is also encrypted for privacy and signed for integrity. Authorization of and security settings for communications are controlled through centrally administered policy.

As to management/policy, the ICL maintains policy rules that control aspects of operation of the ICL. Policy rules also may control whether identities are authorized to register with the network, and whether one identity is authorized to initiate a communication session with a second identity. For example, policy rules may control when encryption should be applied to communication and when communication should be routed through certain underlying networks. The policy mechanisms also may provide extension features that applications can use to manage application-specific policy. Management features include the ability to monitor ICL-level activity and to remotely control all aspects of network operation. An important aspect of the management features include a presence and availability service that lets administrators see what devices are currently on the network and when the devices last registered.

As to network and protocol bridging, the ICL acts as a bridge between different underlying networks. The ICL shields applications from differences in the protocols used to deliver messages on underlying networks. The ICL handles message relaying and routing as messages cross from one underlying network to another, or from one protocol domain to another.

The ICL layers these services on top of existing networks and protocols. In general, an application message exchange is preceded by an ICL message exchange between endpoints and core ICL services. The ICL also adds encryption and other information to each application message exchanged. This general strategy can be applied to a wide variety of messaging semantic models and data exchange protocols.

A messaging semantic model is a general paradigm for data exchange between two communicating endpoints. Each model implies a certain style of API and guarantees associated with that API. Examples of messaging semantic models include reliable, real-time, framed messages; reliable, real-time, streams; and unreliable, non-real-time, framed messages.

With reliable, real-time, framed messages, an endpoint sends a variable-length message to its peer, which receives the message whole. The time required for the message to be received is small relative to the overall time the two endpoints are engaged in conversation. Message models of this kind are typically built as a layer above the transmission control protocol (TCP).

With reliable, real-time, streams, an endpoint communicates with its peer using a stream interface that can be considered as consisting of messages of length one byte. Raw TCP is a familiar example of this kind of messaging model.

With unreliable, non-real-time, framed messages, an endpoint sends a variable-length message to its peer, which receives the message whole. However, unlike the reliable, real-time model, neither delivery of the message, the order of its arrival, nor that only one copy will arrive is guaranteed. The time required for the message to be received is long. E-mail is an example of this kind of messaging model.

Each messaging model can be exposed to applications through a specific API. There will be slight differences in the API depending on the model adapted.

Within a given messaging model and associated API, there are many possible wire protocols that can fulfill the contract of the API. For example, reliable, real-time framed messages can be carried using HTTP, secure HTTP (HTTPS), or an ad-hoc framing protocol written atop raw TCP. Different wire protocols may be desirable in order to comply with different firewall policies, or for other reasons.

The ICL provides an application-level communication API that insulates applications from these choices. For any given messaging semantic model, there is a version of that model adapted to ICL and which preserves the basic character of the messaging model, but which uses identities as the basis for naming endpoints, includes security services, is centrally managed through policy, and can be carried atop multiple protocols and underlying networks. In one implementation, ICL provides an API that supports the reliable, real-time framed message model, and a pluggable architecture in which different network modules carry this messaging over a variety of protocols (including HTTP, HTTPS, and raw TCP).

Figure 4:
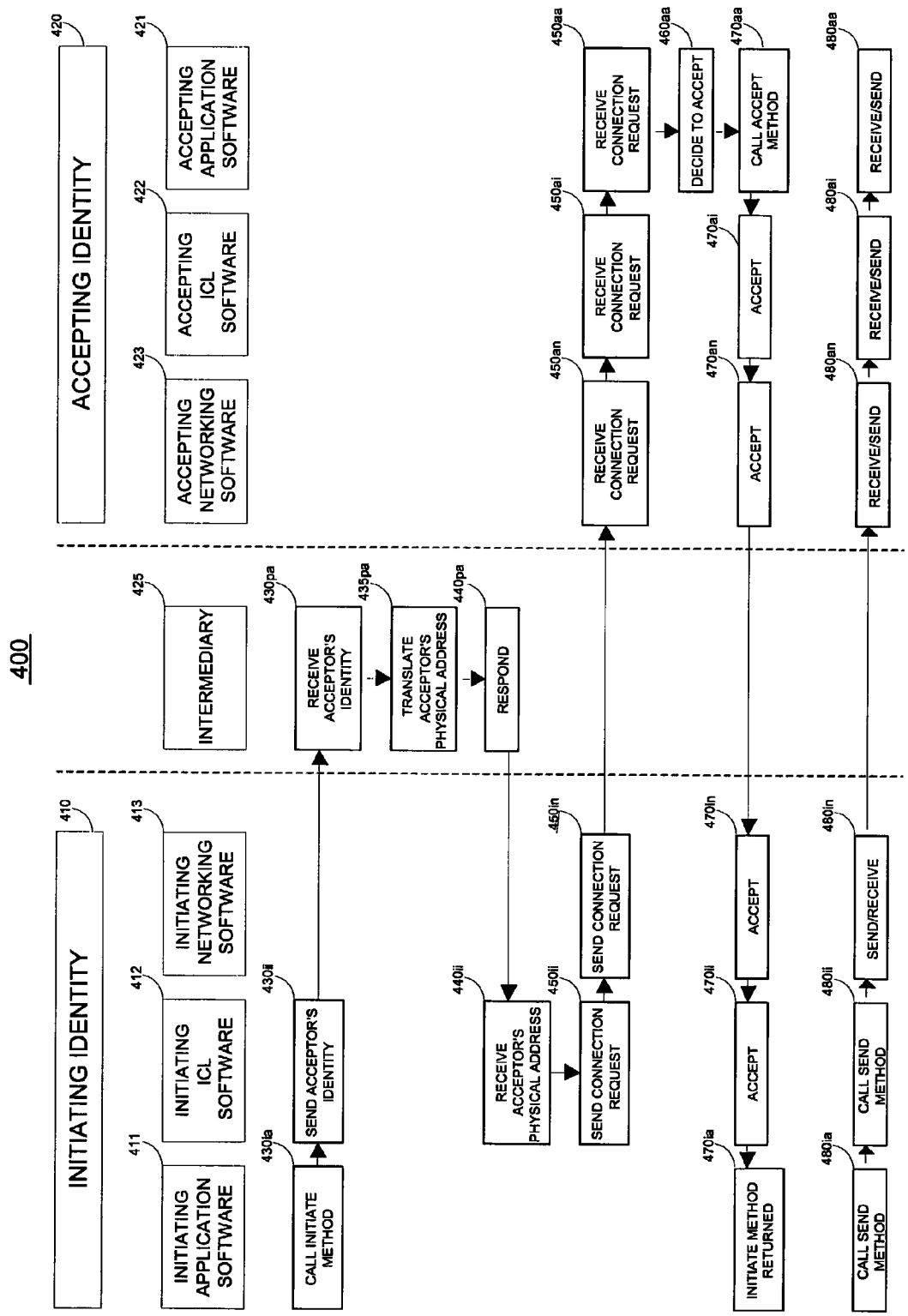
FIG. 4 is a block diagram depicting communications between an initiating identity and an accepting identity using an intermediary to translate an identity into a physical address.

FIG. 4 illustrates a process 400 for communicating between an initiating identity 410 and an accepting identity 420, using an intermediary 425 to translate an identity into a physical address. The initiating identity consists of initiating application software 411, initiating ICL software 412, and initiating networking software 413. The initiating networking software 413 may be native networking software that is provided by the operating system or platform that hosts the initiating identity 410. Similarly, the accepting identity 420 consists of accepting application software 421, accepting ICL software 422, and accepting networking software 423. The accepting networking software 423 may be native networking software that is provided by the operating system or platform that hosts the accepting identity 420.

The initiating application software 411 indicates a desire to communicate with the accepting application software 421 by calling the ICL initiate method and passing to the ICL software 412 the identity identifier for the accepting identity 420 (step 430ia). The initiating ICL software 412 sends to the intermediary 425 a request that specifies the identity identifier for the accepting identity 420 (step 430ii). The intermediary 425 receives the request (step 430pa) and translates the identity identifier for the accepting identity 420 to the physical address corresponding to the accepting identity 420 (step 435pa). The intermediary 425 may, for example, translate the identity identifier by looking up the physical address that corresponds to a particular identity identifier in a table or list. The intermediary 425 then responds to the initiating ICL software 412 by providing the physical address of the accepting identity (step 440pa). The initiating ICL software 412 receives the physical address of the accepting identity (step 440ii).

In general, the initiating ICL software 412 then invokes the initiating networking software 413 to open a native connection to the physical address obtained from the intermediary 425. More specifically, the initiating ICL software 412 sends to the initiating network software 413 a connection request (step 450ii), and the initiating networking software 413 sends to the acceptor's native networking software 423 a native networking request for connection (step 450 in). The request is received by the accepting native networking software 423

(step 450*an*) and passed up through the accepting ICL software 422 (step 450*ai*) to the accepting application software 421 (step 450*aa*).

The accepting application software 421 determines whether to accept the incoming connection request (step 460*aa*). When the incoming connection is accepted, the accepting application software 421 calls the accept method of the accepting ICL software 422 (step 470*aa*). The acceptance, such as an acceptance indicator, is passed through the acceptor's ICL software 422 to the acceptor's native networking software 423 (step 470*ai*), and is sent, in turn, to the initiator's native networking software 413 (step 470*an*), to the initiator's ICL software 412 (step 470 in), and to the initiator's application software 411 (step 470*ii*). When the initiator's application software 411 receives the return value of the original ICL initiate method (step 470*ia*), the establishment of an ICL session between the initiating identity 410 and the accepting identity 420 is complete. In this manner, the established ICL session wraps a native network connection between the physical address corresponding to the initiating identity 5 and the physical address corresponding to the accepting identity.

Once the ICL session has been established between the initiating identity 410 and the accepting identity 420, either identity's application software may send a message to the other identity's application software by using the ICL. When the initiating identity's application software 411 sends a message to the accepting identity's application software 421, the initiating application software 411 calls the send method of the initiating ICL software 412 (step 480*ia*), the send method of the initiating ICL software 412 calls the send method of the initiating networking software 413 (step 480*ii*), and the send method of the initiating networking software 413 sends the message over the network to the accepting networking software 423 (step 480*in*). The accepting networking software 423 receives the message (step 480*an*) and passes the message to the accepting ICL software 422 (step 480*ai*). The accepting ICL software 422 then passes the message to the acceptor's application software 421 (step 480*aa*).

When the accepting identity's application software 421 sends a message to the initiating identity's application software 411, the process described in steps 480*ia* to 480*aa* is reversed. That is, the accepting application software 421 calls the send method of the accepting ICL software 422, which, in turn, calls the send method of the accepting networking software 423. The message is then passed from the accepting ICL software 422 to the accepting networking software 423 to the initiating networking software 413 to the initiating ICL software 412 to the initiating application software 411.

During communication between the initiating identity and the accepting identity, the ICL software 412 and 422 may perform additional computation or checks on behalf of the application software. For example, if the accepting application software 421 sends a message to the initiating application software 411, the accepting ICL software 422 may encrypt the data, and the initiating ICL software 412 may decrypt the data. (For communication in the opposite direction, the roles of encrypting and decrypting are reversed.) In this way, the data in the message is protected from unauthorized access regardless of the level of security provided by the native networking software and the network itself. The application software 411 and 421, however, is the same regardless of whether encryption is employed.

In another example, the accepting ICL software 422 may append to the data a cryptographic message authentication code (MAC), and the initiating ICL software 412 may verify that the received MAC is consistent with the data received. (The roles are reversed for communication in the opposite direction.) This may provide assurance that the data has not been altered by an unauthorized third party when the data was carried over the native networking software and the network itself. The functions of encrypting/decrypting and the use of MACs may be used singly, or in combination.

When the ICL software 412 and 422 perform additional computation or checks such as encryption/decryption or use of MACs, both the initiating ICL software 412 and the accepting ICL software 422 must agree on what computation or checks are to be performed during a given communication session. A variety of implementations may be used for reaching this agreement. In one implementation, the ICL software may be instructed by the respective application software 411 and 421 of the computation or checks to be performed, assuming that the application software 411 and 421 have reached agreement by some other means. In another implementation, the initiating ICL software 412 and the accepting ICL software 422 may exchange messages to arrive at agreement prior to the exchange of application data as to what computation or checks are to be performed. In yet another implementation, the initiating ICL software 412 and the accepting ICL software 422 may consult a separate policy service, such as the ICL's policy service 395 in FIG. 3, to make this determination, based on the identity identifiers of the initiating identity 410 and the accepting identity 420. In yet another implementation, the policy service may be consulted as part of another process, such as the session establishment process 870 of FIG. 8 or the session establishment process 1000 of FIGS. 10A and 10B, both of which are discussed below.

When the initiating ICL software 412 and the accepting ICL software 422 agree to employ encryption/decryption or MACs, they also need to agree on what specific cryptographic algorithms to use, and what cryptographic keys to use in conjunction with the cryptographic algorithms. The selection of the particular cryptographic algorithms to use may be arrived at by any of the means described above for coming to agreement on whether to employ encryption/decryption or MACs at all. Examples of specific algorithms for encryption and decryption include DES, triple DES, AES, and RSA. Examples of specific algorithms for creating message authentication codes include SHA1-HMAC and MD5-HMAC. The agreement as to what keys to use may be achieved by a variety of means. In one implementation, a shared symmetric key may be arrived at through use of the Diffie-Hellman key agreement algorithm. In another implementation, a shared symmetric key may be delivered to the initiator and acceptor by a third party key distribution center. In this implementation, the interaction with the key distribution center may be performed separately, or it may take place as part of a larger process such as the session establishment process 870 of FIG. 8 or the session establishment process 1000 of FIGS. 10A and 10B.

The intermediary 425 may have many implementations. In one implementation, the intermediary 425 may be a file that specifies a physical address for each of several identity identifiers. In another implementation, the intermediary 425 may be a presence and availability service, such as the ICL's presence and availability service 385 in FIG. 3. In another implementation, the interaction between the initiator's ICL software 412 and the intermediary 425 (steps 430*ii*, 430*pa*, 435*pa*, 440*pa*, and 440*ii*) may take place as part of a larger process such as the session establishment process 870 of FIG. 8 or the session establishment process 1000 of FIGS. 10A and 10B.

Figure 5:
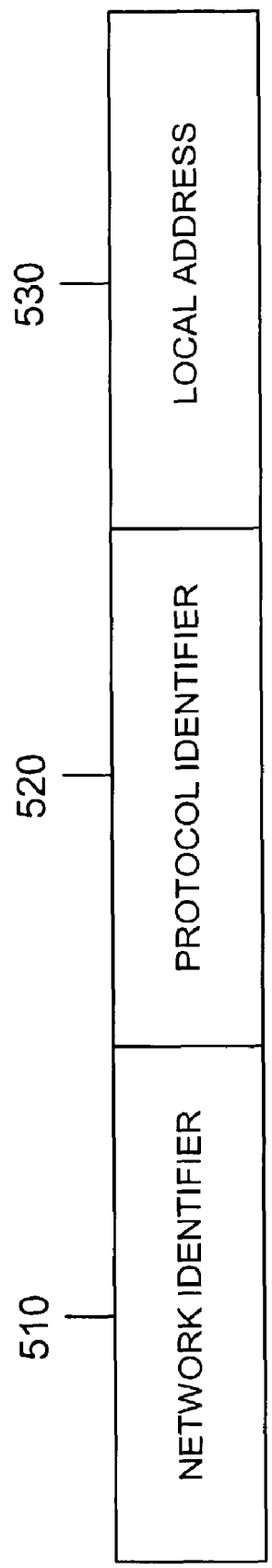
FIG. 5 is a block diagram showing a data structure used for a physical address.

Referring also to FIG. 5, the physical address returned to the initiating ICL software 412 in step 440*pa* may take any of many forms. FIG. 5 illustrates an example data structure 500 for a physical address. The data structure 500 includes a network identifier 510, a protocol identifier 520, and a local address 530.

The network identifier 510 specifies a particular native network to be used to communicate with an identity. Examples of a particular native network include the global Internet, a private network operated by an enterprise, and a satellite paging network. When two endpoints have global addresses whose network identifiers are equal, then the two endpoints can communicate directly with each other using the native networking software associated with that network. When two endpoints have global addresses whose network identifiers are not equal, then the two endpoints may need to communicate using a relay such as the relays 215 and 220 in FIG. 2. The protocol identifier 520 specifies the communication protocol and message formatting scheme to be used for messages. Examples of a particular protocol include HTTP, HTTPS, and a simple message framing protocol built atop TCP.

The local address 530 specifies the information that the native networking software needs to identify a communications peer. In general, the exact form of the local address 530 depends on the specific network identifier 510 and protocol identifier 520 being used. For example, when the network identifier 510 specifies the global Internet and the protocol identifier 520 specifies a simple message framing protocol built atop TCP, then the local address takes the form of an IP address and TCP port number. In another example, when the network identifier 510 specifies the global Internet and the protocol identifier 520 specifies HTTP, then the local address takes the form of an HTTP Uniform Resource Locator (URL).

Figure 6:
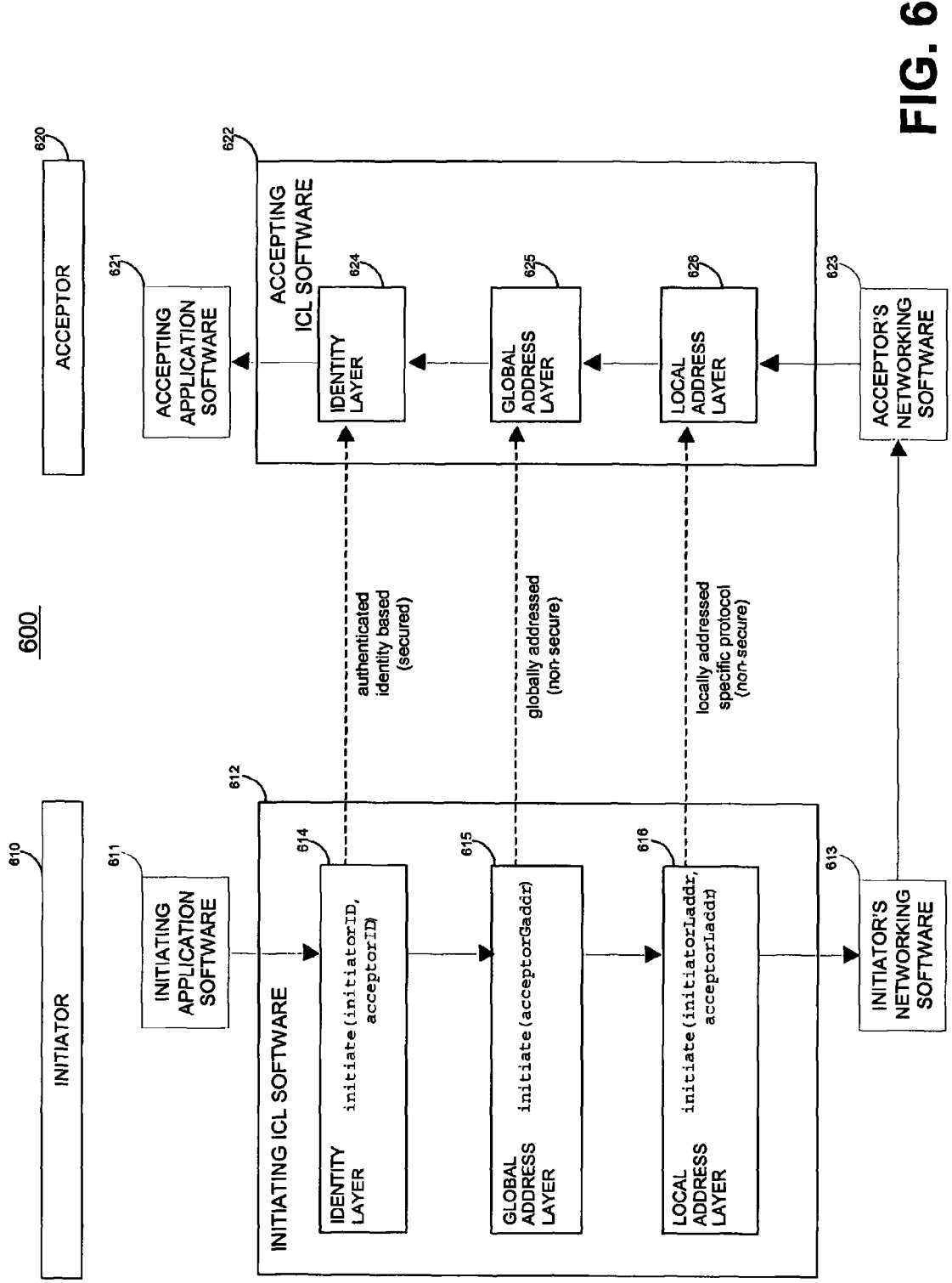
FIG. 6 is a block diagram illustrating a three-layer implementation of identity-based communication layer software.
Figure 10A:
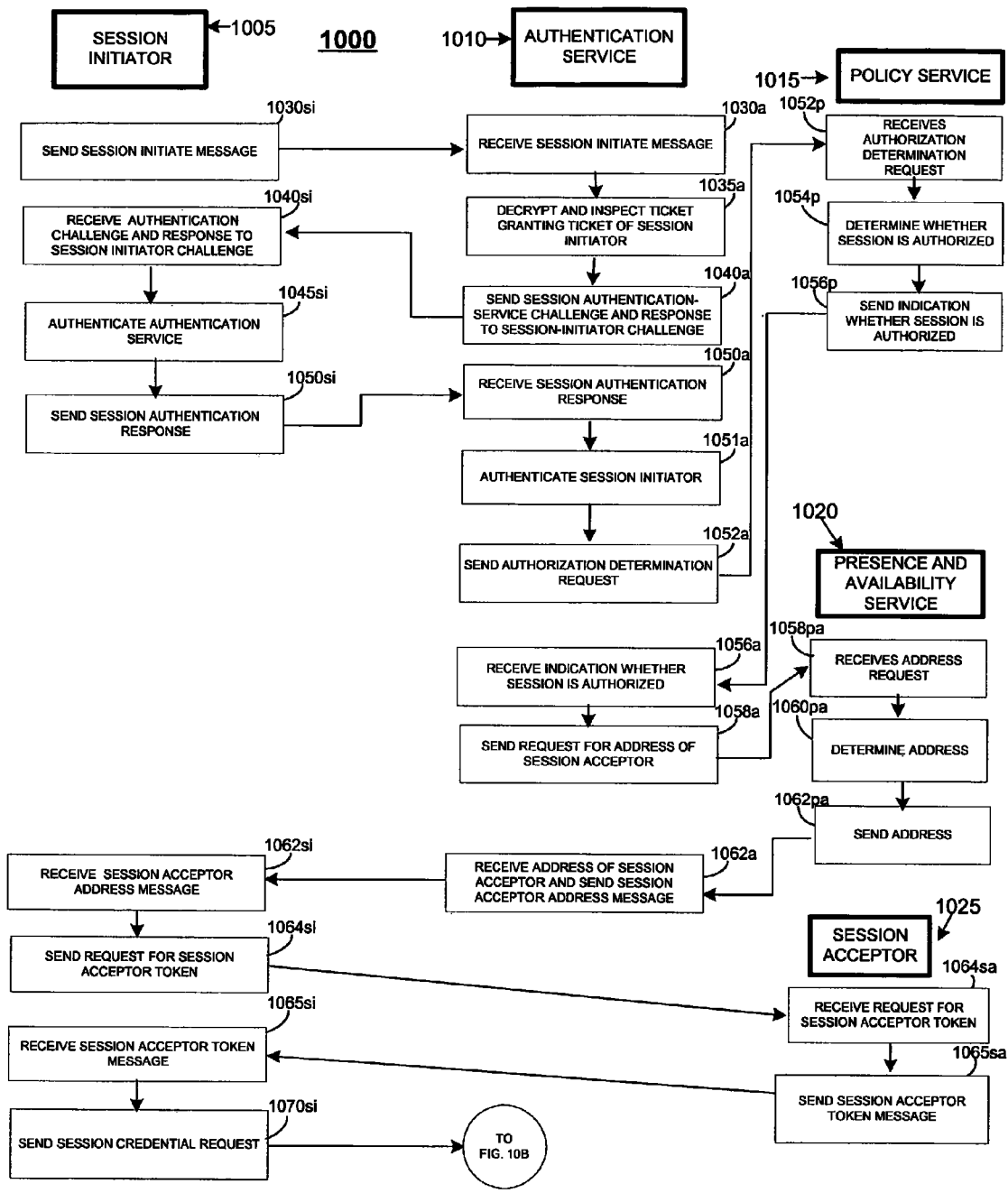
FIGS. 10A and 10B are block diagrams depicting establishing a communications session by using a challenge and response protocol involving a session initiator, an authentication service, a session acceptor, a presence and availability service, and a policy service.
Figure 10B:
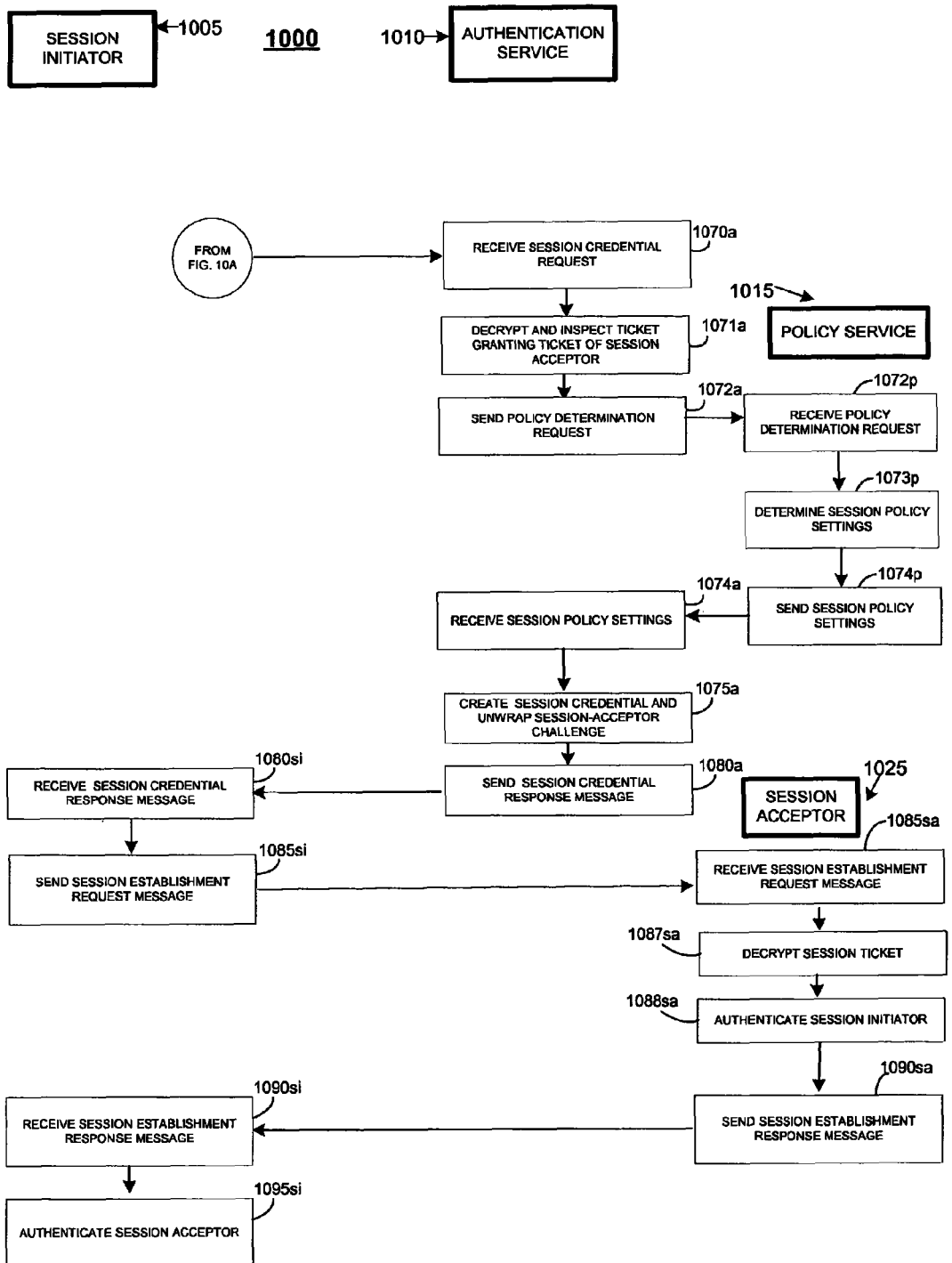

Referring to FIG. 4, one implementation of the communication process 400 employs a set of software layers, as illustrated in FIG. 6. FIG. 6 shows the initiating ICL software 612 (corresponding to item 412 in FIG. 4) implemented using three software layers. The software layers are the identity layer 614, the global address layer 615, and the local address layer 616. The identity layer 614 presents to the initiator's application software 611 an interface in which both the initiator 610 and the acceptor 620 are named by their respective identity identifiers. The identity layer 614 is responsible for translating an identity identifier into a global address. When encryption/decryption or MACs are to be employed, the identity layer 614 also performs those functions. Similarly, when an authentication process, such as the session establishment process 1000 of FIGS. 10A and 10B, is used, the authentication process also is performed within the identity layer 614.

The global address layer 615 presents to the identity layer 614 an interface in which both the initiator 610 and the acceptor 620 are named by their respective global addresses. The global address layer 615 interprets the global address to determine the particular network and the particular protocol to be used. In the case where the accepting global address's network identifier (such as item 510 in FIG. 5) specifies a network that is not directly available to the initiator, the global address layer 615 is responsible for determining an appropriate relay to use to reach the acceptor's network.

The local address layer 616 presents to the global address layer 615 an interface in which both the initiator 610 and the acceptor 620 are named by their respective local addresses (such as item 530 in FIG. 5). Because a local address is meaningful only with respect to a particular network and protocol, the local address layer 616 is bound to a specific choice of network and protocol.

An implementation of the ICL software 612 may have available several alternative implementations of the local address layer 616, with each implementation corresponding to a particular choice of network and protocol. The global address layer 615 selects from among these alternative implementations to determine a particular network and a particular protocol to use. The local address layer 616 carries out the selected protocol, including encapsulating application data in network messages as dictated by the selected protocol, and interacting with the initiating networking software 613. For example, a local address layer implementation intended for a simple message framing protocol atop TCP may prepend each message with a message length indication, and send the encapsulated message that includes the message length indication using the native network's implementation of TCP. In another example, a local address layer implementation intended for HTTP may insert the message into the body of a HTTP GET message, with headers and other information included as dictated by the HTTP protocol specification.

The accepting ICL software 622 (such as item 422 in FIG. 4) may have a set of layers 624, 625, and 626 that correspond to the layers 614, 615, and 616, respectively, of the initiator's ICL software 612.

Security in communication networks is an umbrella term that refers to several different aspects of protecting sensitive data in the communication, including authentication, confidentiality, and integrity. Authentication means that the recipient of a communication can confirm that the sender is who the sender purports to be, and vice versa. Authentication prevents an unauthorized third party from masquerading as a legitimate user, device, or enterprise application. Authentication is of particular importance in device applications, where devices are often in locations at which they are not subject to the physical security enjoyed by computers located within the walls of an enterprise's headquarters.

Confidentiality refers to protecting communications from being intercepted and understood by an unauthorized third party. The primary tool for insuring confidentiality is strong cryptography. The weak link in any cryptography scheme is the management of the keys, so it is essential that the network architecture provide for secure key exchange. The authentication procedures play a pivotal role in key exchange.

Integrity means that an unauthorized third party is unable to intercept a communication and modify the communication before the communication reaches the intended recipient. Integrity can be achieved through the use of message authentication codes (MACs), digital signatures, or similar techniques. Like encryption, integrity assurance is based on cryptographic techniques for which key management is a central issue.

The underlying networks on which the ICL is implemented may not themselves offer sufficient security. For example, an underlying network that uses raw TCP on the public Internet may provide inadequate security. Therefore, the ICL employs techniques that may be used on top of a wide-variety of underlying networks. An underlying network may be referred to as a native network.

As to identity, any communication in a network must identify the sender and receiver. In most networks, this is done by a physical address of some sort, such as, for example, an IP address or a telephone number. An address of this kind has a structure that is specific to the particular network being used, and usually reveals something about the topology of the network (e.g., if two U.S. phone numbers share the first six digits, the phone numbers are served from the same central office).

Physical addresses have serious weaknesses as the basis for enterprise device applications for a number of reasons. First, devices may be mobile and may have addresses that change as the devices cross from one network boundary to another. Second, there may be more than one network involved. For example, an energy company may have some gas stations in metropolitan areas where DSL Internet service is available, others where a cellular telephony network must be used, and very remote stations where a satellite paging network is the only one available. This means that otherwise similar devices will have physical addresses drawn from dissimilar address spaces. Third, physical address spaces may have restrictions unsuitable for large scale applications. For example, it is not feasible for an enterprise to obtain one million public Internet IP addresses to use for small ID tags scattered throughout the world. Private networks are routinely created to overcome such limitations, but such networks may be unable to reach devices from a different private network.

Because of these weaknesses, physical addresses may be inadequate as the basis for identifying senders and receivers in enterprise-class device applications. Instead, an identity-centric approach is employed. Every device, enterprise application, or other network service—anything that can act as an endpoint for communication—carries a unique identity. The namespace of identities is independent of all of the underlying physical address spaces. A mobile device keeps the same identity, even if the address of the device changes. From the application's point of view, communications are directed to identities, not addresses. The network architecture maintains the association between identities and addresses, and routes communication accordingly.

Identities are also the basis for achieving end-to-end authentication. Any participant in a communication can convince its partner of the authenticity of its identity. Various attributes, such as software version, owner, and so forth, may optionally be associated with identities, which means that the attributes also can be authenticated.

Devices may have more than one identity. For example, a handheld scanner used by a package delivery company may have two identities: one installed by the manufacturer and keyed to the manufacturer's serial number for the device, and the other created by the package delivery company according to the company's naming scheme and installed when the scanner was purchased and deployed within the enterprise. Different identities may have different permissions, and different levels of trust in their authentication. In the previous example, the manufacturer's identity might only permit interaction with a provisioning service that establishes the enterprise identity while only the enterprise identity, authenticatable through the enterprise's own certifying authority, would have full rights to interact with the enterprise application.

Some identities are long-lived and created through administrative activity. These include persistent device identities, as well as identities associated with users, applications, and other real-world entities. Other identities arise transiently, through programmatic activity. An example is an identity representing a particular user logged into a particular device. The identity system has a rich language for defining these different kinds of identities.

As to manageability, the ability to remotely provision, monitor, and administer devices is central to a successful deployment. While remote administration of computer systems is common today, the device world introduces new challenges in this area, including identity management, policy driving, and controllable communication.

As to identity management, devices have identities that must be managed. A device has an identity because the device has a long-term relationship to the enterprise. In this sense, a device is unlike a web client, which exists outside the enterprise and has no particular long-term relationship to the enterprise. A device is much more like an internal user of the corporate network. Just as enterprises must manage directories of their internal users, enterprises also must maintain directories of device identities, along with their attributes, authentication credentials, and so forth.

As to policy driving, as membership in the network is highly dynamic, permissions and other elements of device configuration must be driven by policy, not by individual settings. In a very static network, it is sufficient for an administrator to set configurations and permissions by selecting an existing entity or group of entities and changing their settings. But with new devices being discovered dynamically, this process must be controlled through rule-based policies. An example of such a rule-based policy is "all model 701 scanners in the eastern region should have permission to use the inventory service on machine XYZ." Devices then receive their settings based on the rules that apply to them.

As to controllable communication, since there is often not a system administrator available at the location of a device itself, the network must provide enough visibility and control so that problems can be diagnosed and solved remotely. For example, if a determination is made that devices are being subjected to a virus attack, control mechanisms must be in place to support shutting down those devices remotely. In the event the under-attack devices cannot be remotely shut down, mechanisms must be in place to instruct the network to refuse further communications from the devices. Thus, the network's control mechanisms support the addressing of problems at multiple levels and thereby allow the construction of robust management policies.

In general, web services architecture may be poorly suited for device applications. This may be so primarily due to differences between web applications and device applications, including bi-directional initiation of communication, ownership of devices, long-term relationships, relationships that outlast network associations, inhomogeneous protocols and networks, need for greater security, need for centralized control, need to inventory and organize devices, complex identity relationships, and need for resilience against denial of service.

As to bi-directional initiation of communication, conversations in device applications may be initiated both by the device connecting to the enterprise and by the enterprise connecting to the device. In contrast, web services are designed to support a model where an entity outside the enterprise initiates a conversation by connecting to a server within the enterprise, exclusively. For example, the web services architecture has no provision for an enterprise to connect to a specific browser.

As to ownership of devices, the devices that communicate with an enterprise are usually owned by the enterprise to which they connect, and so enterprises wish to have a long-term understanding of the inventory and connection profiles of devices. This is completely different than the web services model, in which the entities outside the enterprise that connect using HTTP are not owned by the enterprise they are contacting. The web services protocols, therefore, have a very anonymous nature when it comes to the identity of the client—the server knows very little about the client other than incidental information such as IP address that is only loosely connected to any sense of client identity, if at all. This is not appropriate for devices: it is important to an enterprise, for example, if the enterprise does not hear from specific devices over a period of time, or if rogue devices attempt to connect. Device services are always delivered with respect to a known set of valid devices.

As to long-term relationships, each device interacting with the enterprise has a long-term relationship with the enterprise. For example, a kiosk deployed at a customer site has a persistent identity as belonging to that customer, and that identity is important to every transaction in which the kiosk participates. In the web services model, there is no notion of continuity of identity between sessions, and no adequate mechanisms for layering that notion on top. Browser cookies are a very weak attempt to provide such a facility, but they suffer from many shortcomings.

As to relationships that outlast network associations, the long-term relationship between a device and the enterprise persists even if the device changes its network address due to mobility or changes in network service provider. Thus, while the web service model provides access to the underlying network address as a means of client identification, such access is of little use for device applications.

As to inhomogeneous protocols and networks, a single device application may require many different protocols and networks in order to provide connectivity to every device. This arises from constraints of device capability, as well as a complex and changing landscape of networks required to reach every corner of the device world. The web services model assumes a uniform space of IP networks and the HTTP protocol.

As to security, device applications typically require greater security than web services applications, because device applications represent an extension of the boundaries of an enterprise outside the four walls of the machine room. Web services, in contrast, represent interactions with outside parties, and so the range of operations is typically restricted to a point where security requirements are less.

As to centralized control, the devices of device applications are part of the enterprise, but have no system administrator sitting next to them. It is therefore important to provide extensive means for centralized, remote control of devices and their ability to interact with the enterprise. In web services, the clients are not part of the enterprise, and so there is no such requirement for control. The web services architecture does not provide any mechanisms for this.

As to the need to inventory and organize devices, devices are part of the enterprise, and, as a part of managing devices, enterprises need to be able to record all devices, organize them in meaningful ways, associate attributes with them, and so on. No such requirement exists for the clients of web services, since the clients are anonymous, constantly changing, and in no way owned by the enterprise.

As to complex identity relationships, the identities of participants in device applications can be complex. For example, a particular truck driver logged into a particular handheld package scanning device represents a complex association of two identities (the driver and the scanner). For purposes of tracking data and assigning policy, it is desirable to track both of these identities in every interaction. The web services model provides very little support for such complex relationships.

As to denial of service, device applications require resilience against denial-of-service attacks. It is important that any attempt at unauthorized access be blocked as soon as possible, so that an attacker cannot consume inordinate amounts of CPU before access is denied. In the HTTPS web services model, there is a very expensive exchange to set up an HTTPS connection before the user's password can be entered. Accordingly, the HTTPS model is much more vulnerable to this kind of attack. In the web services world, this is considered acceptable because there is usually useful content to be delivered to the user prior to the user entering his password, and so the set up of the HTTPS connection is not considered wasteful.

Figure 7:
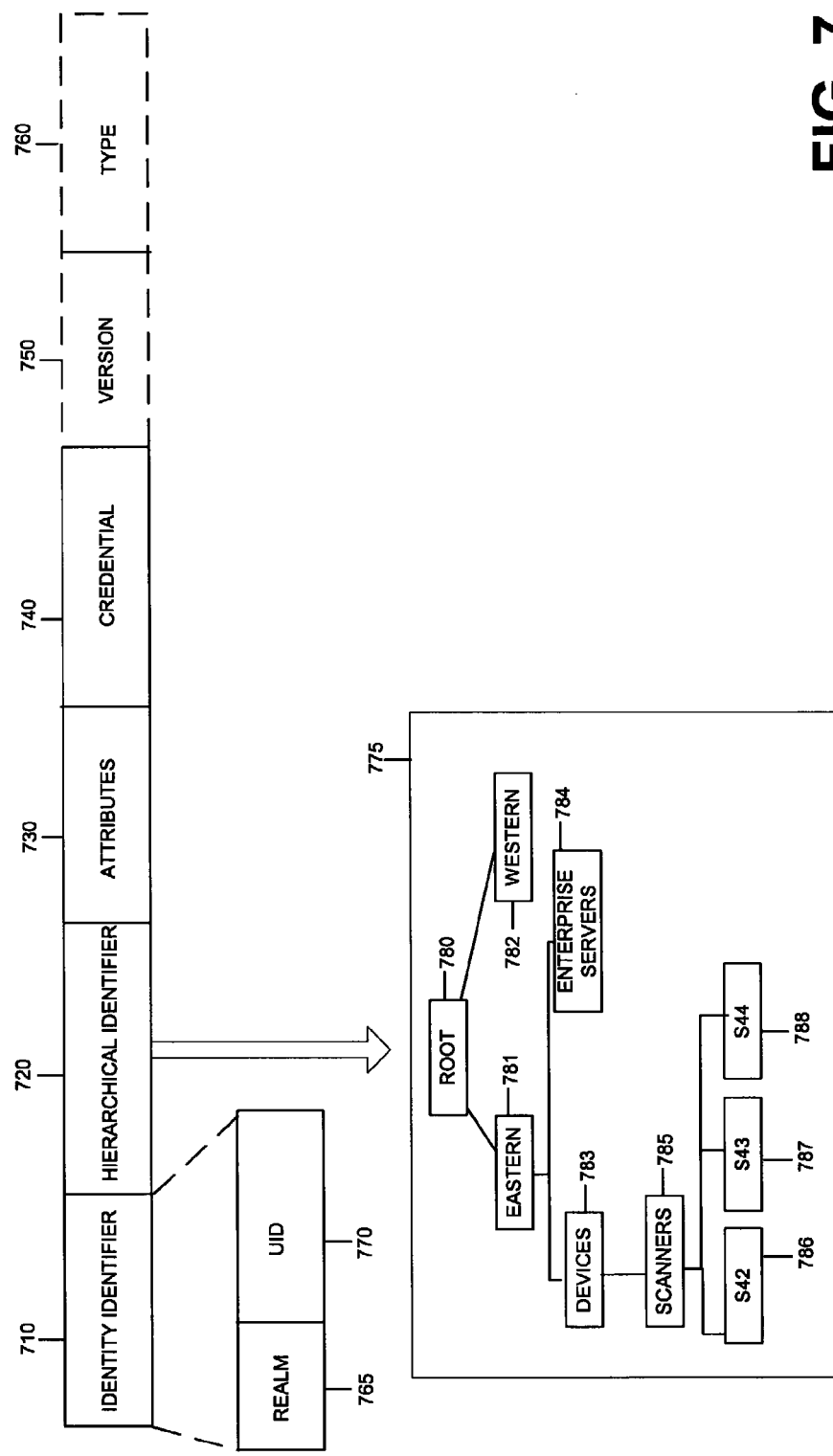
FIG. 7 is a block diagram depicting a data structure used for an identity.

FIG. 7 illustrates an example data structure 700 for an identity. An identity may be used within the ICL system architecture to name a communication endpoint, as the subject of administrative activity, and to tag individual items of data.

An identity may be used to name a communication endpoint by identifying an entity that sent or received a communication. Identities are generally independent of physical address. Physical-address independence provides a more robust way of specifying communication endpoints when the enterprise infrastructure, including protocols and network addresses, is subject to change.

The authentication of identities also may improve the degree of security provided in communications using the ICL. The ICL system architecture may provide a more robust system because identities are authenticated. In particular, for an identity to be recognized and used within the system, a device or other entity claiming the identity must first authenticate itself by offering proof that it has a right to that claim. Typically, authentication involves proving knowledge of a secret known only to the legitimate holder of the identity, e.g., a password or cryptographic key. When the identity is subsequently used as the basis for communication, or for administration or data tagging, the strength of the authentication leads to a higher level of confidence in these subsequent uses.

An identity may be the subject of administration activity. The ICL architecture provides for a centralized, declarative management of infrastructure and of applications. Policy rules that govern management activity, such as security parameters and what devices may interact with what other devices, may be based on identities and attributes associated with identities. For example, authenticated identities may be the basis for granting authorization to perform various actions within the system. Authenticated identities also may select provisioning information used to initialize and control autonomous activities, including the securing of communication. Policy based on identities and associated attributes also may be used by application developers to provision and control application behavior.

An identity may be used to tag individual items of data that are communicated across the network. By combining endpoint identities with unique sequence numbers, each data element in the system may be given its own identity. Data identities may provide applications with metadata about the data, including how and when the data was created. Identity may also be used to as a basis for joining together data collected by independent applications.

The data structure 700 includes an identity identifier 710, a hierarchical identifier 720, attributes 730, a credential 740, and, optionally, a version number 750 and a type 760.

The identity identifier 710 refers to a name that is unique across all identities. The identity identifier 710 may be referred to as an underlying name or a "uname." The identity identifier for a specific identity is not changed over the lifetime of the identity, and is not reassigned to a new identity. The identity identifier 710 may be assigned in such a way as to be unique within the particular enterprise. In some cases, an identity identifier 710 may be assigned in such a way that the identity identifier is unique across all enterprises (and not merely unique within a particular enterprise). This may provide an advantage in that an identity identifier that is unique across enterprises may enable interactions between enterprises without requiring a joint-enterprise naming authority for devices.

In some implementations, an identity identifier 710 may be assigned to uniquely identify an identity across enterprises. For example, in such an implementation, the identity identifier 710 may include a realm 765 and a unique identifier 770 (or UID). The realm 765 identifies a particular instance of the identity service, across all enterprises. When an identity service is assigned a different realm from all other identity services, the identity service is able to assign unique identities independently. A realm for an enterprise may be the Internet domain name owned by the enterprise. When an enterprise operates more than one identity service and, hence, needs more than one domain name, the enterprise may create child domain names based on the domain name of the enterprise for each identity service in the enterprise. This permits the assignment of unique identity identifiers across enterprises that are not centrally managed or in partnership (or otherwise associated) with one another.

The UID uniquely identifies each identity in the realm. The UID may be an integer, such as a randomly-assigned integer, that is assigned uniquely to each identity within a realm. Together, a realm and a UID form an identity identifier that is unique across enterprises.

Unique identity identifiers are assigned based on an allocation of a particular identifier from a particular namespace. In one particular implementation, a namespace provides for different size UIDs and reserves some UIDs for well-known identities. For example, the namespace may use a 32-bit UID when an enterprise includes a relatively small number of UIDs, a 64-bit UID when an enterprise has exceeded the identities available using a 32-bit UID, and a 128-bit UID when the enterprise has exceeded the UIDs available using the 32-bit and 64-bit UIDs. This particular namespace may be advantageous. For example, the particular namespace may result in system efficiencies because shorter UIDs (e.g., 32-bit UIDs rather than 64-bit UIDs) are used where possible while capacity is provided for a very large number of UIDs through use of 64-bit or 128-bit UIDs.

The described implementation also provides an indication as to whether the UID is a composite identity, which may provide a benefit. For example, an application can determine whether to send a query to the identity service to recover constituent identities.

The ranges of UIDs included in the table below are valid in a particular implementation.

| Range | Structure | Reserved range for well-known identities |
| --- | --- | --- |
| 32 bit UIDs | TT.0.[29 bits] | TT.0.[19 zeros].[10 bits] |
| 64 bit UIDs | TT.10.[60 bits] | TT.10.[40 zeros].[20 bits] |
| 128 bit UIDs | TT.110.[123 bits] | TT.110.[83 zeros].[40 bits] |

Within each range, the first two bits indicate the type of identity, as described in the table below.

| TT | Meaning |
| --- | --- |
| 00 | Physical Identity |
| 01 | Virtual Identity |
| 10 | Composite Identity |
| 11 | [Reserved for future use] |

Within each range, a subset of the range, such as within the 32-bit range, may be set aside for use by well-known identities. The reserved 11 value for the TT bits is available if the identifier management scheme is extended or replaced with an alternative management scheme.

The hierarchical identifier 720 refers to a name for an identity that is unique within a hierarchical directory namespace maintained by the enterprise. The hierarchical identifier 720 may also be referred to as a hierarchical name or "hname." Unlike identity identifiers, hierarchical identifiers may be changed based, for example, on the needs of the enterprise. The attributes 730 of the identity are associated with the identity identifier 710. This allows a change to be made to the hierarchical identity of a device without requiring a corresponding change to the identity identifier, authenticating credentials for a device based on an identifying identifier, or other data associated with the identity identifier. The use of a hierarchical namespace may be advantageous when an enterprise includes a network of a large number of devices, such as thousands or millions of devices.

In some implementations, the hierarchical identifier 720 is associated with a hierarchical namespace 775. For brevity, only a few of the elements are depicted in the hierarchical namespace 775. The hierarchical namespace 775 is a directory-like structure that includes a root 780 and leaves 781-788. The path from the root to a leaf implies a hierarchical identifier, and the leaf is the identity bearing that hierarchical identifier. A hierarchical identifier directory facilitates scalability and the decentralized administration of a large number of identities.

For example, the hierarchical namespace 775 is organized based on geographic regions, types of devices, and enterprise servers. The leaf 781 represents an Eastern region of an organization and all identities associated with the Eastern region are represented as leaves (here, 786-788) that descend from leaf 781. To help organize the identities associated with the Eastern region, the hierarchical namespace 775 includes a container (represented by leaf 783) to group devices and a container (represented by leaf 784) to group enterprise servers. In hierarchical namespace 775, the devices are also categorized by type, and a container (represented by leaf 785) is used to group scanners, which are a type of device. The scanner devices themselves are represented by leaves 786-788. Each terminal leaf in the hierarchical namespace 775 represents a device.

The hierarchical identifier of a device (or other identity represented in a hierarchical namespace) is based on the hierarchical path from the root node to the terminal node that represents an identity. For example, the hierarchical identifier for the device represented by terminal node 786 may be a concatenation of the leaf names. Specifically, the hierarchical identifier for leaf 786 may be root/Eastern/devices/scanners/s42.

In some implementations, the leaf of the tree is not the identity itself, but a reference to the identity's identity identifier 710. The attributes and credential for the identity are associated with the identity identifier, not the hierarchical identifier. This allows an identity's hierarchical identifier to be changed, or the hierarchical identifier tree to be reorganized, without affecting the underlying identity identifiers. As a result, changes to hierarchical identifiers do not require changing the imprinted identity identifiers or credentials in devices.

The attributes 730 refer to data associated with an identity. The attributes 730 are used to provide additional descriptive information for identities. For example, an identity representing a scanner device might have as attributes the manufacturer's name and model number. The attributes 730 typically are represented as one or more name/value pairs. The attributes 730 may be assigned by the enterprise and/or the application developer.

Applications may use the attributes 730 to guide application behavior. For example, an application for monitoring a weather station may have several operating parameters that control the behavior of the application for each weather station device under control of the application: sampling rate, hours of operation, calibration data, and so on. By storing this information as attributes of the device identities, the application makes this data much more visible to administrators and other applications.

Some implementations may include an attribute schema that defines what attributes an identity will have, and what types of permitted values an attribute may have. A particular schema may be associated with many identities of a similar type. For example, an enterprise may create a schema for each category of device or other identity in the system (e.g., one schema for weather stations, another for package scanners, and another for users).

The credential 740 refers to a credential that the holder of the identity uses to prove that the identity is authentic. The credential typically is known only to the holder of the identity and to the authentication service, such as authentication service 380 of FIG. 3, or other type of security management service provided by the ICL. The credential 740 may be included in the identity data structure 700 or, in some implementations, the credential 740 may be a separate data structure that, when instantiated, may be associated with the instantiation of an identity data structure 700. In some implementations, the credential 740 may be associated with the identity rather than being included in the identity.

The version 750 refers to a version number associated with an identity. A version number of zero is assigned to a newly-created identity. The version number is incremented each time a change is made to attributes 730 or the hierarchical identifier 740. The version number may provide a way for distributed applications to coordinate their respective views of identity information. For example, an application has an application portion that runs on a device and the application communicates with another application portion that runs on an enterprise server. To operate properly, the application may need a consistent view of the values of attributes in both portions of the application (e.g., the one on the enterprise server and the one on the device). The two application portions may exchange the identity version numbers to ensure that both application portions are accessing the same view of the attributes. Some implementations may not include a version 750 for an identity in an identity data structure.

An identity may be one of several types, including a physical identity, a composite identity, a virtual identity, or a well-known identity. The type 760 identifies the one of several identity types applicable to the particular identity. Some implementations may not include a type 760 in an identity data structure.

A physical identity may be associated with a concrete, singular, physical entity. Examples of a physical identity include a device or and an enterprise server. A physical identity is associated with a physical address, such as a network address. A physical identity may be an endpoint identity in a communication session using the ICL.

A virtual identity is used to represent a non-physical entity. For example, a virtual identity may be a user account that is associated with a person. A virtual identity may have the same capabilities with respect to administration and data tagging as the capabilities of a physical identity. A virtual identity, however, cannot be an endpoint identity in a communication session using the ICL because the virtual identity is not associated with a physical network address.

A composite identity is used to represent temporal associations between different kinds of identities (e.g., a specific user logged into a specific device). Typically, a composite identity combines a physical identity with one or more virtual identities. A composite identity may have the same capabilities with respect to communication, administration, and data tagging as a physical identity does. For example, like a physical identity, a composite identity may be used as a communications endpoint. This may be accomplished because a composite identity has a physical identity as one of its constituents. The physical identity of the composite identity maps to the associated physical address that is needed to establish communications. The ability of a composite identity to serve as a communications endpoint may provide a benefit including the ability to tag data using the composite identity (e.g., a driver using a device), instead of using the device identity, to identify the person who entered the data using the device.

Although a physical identity is limited to a single instantiation, other types of identities, such as a virtual identity or a composite identity, may represent a non-physical concept that can, at a given time, exist in any number of instantiations. For example, a user logging onto a particular device may log on more than once such that each user login is associated with a composite identity. Virtual and composite identities provide a means for expressing transient relationships between separately administered entities in a system.

Other examples of situations that may benefit from a composite identity include a device proxy scenario and an identity chain scenario.

A device proxy may be used to control many devices. For example, an oil well may include many sensors, at least some of which may not be computationally powerful enough to operate the software platform. The sensors may be connected to a concentrator device that acts as a proxy for the sensors. The proxy may be a computer system that is capable of operating the software platform. The proxy then may act as the endpoint that hosts each of the identities associated with the sensors.

One approach may be that the proxy hosts a different physical identity for each sensor, with all of those identities sharing a physical address (the address of the proxy). An alternative approach is to assign each sensor a virtual identity and have the proxy create a composite identity for each sensor, where each composite identity combines the physical identity of the proxy with the virtual identity of the sensor. Because the physical identity of the proxy is used, communication traffic uses the proxy's physical address. Compared to using separate physical identities for each sensor, this scheme has an advantage that the identity of the proxy is retained. This enables an application to analyze characteristics of the proxy as well as characteristics of each sensor.

An identity chain scenario involves the assignment of a multiple identities to a particular device. A manufacturer may imprint a distinct identity into each device manufactured and retain the identity information in the manufacturer's own identity database. A customer may purchase multiple devices from the manufacturer and imprint an identity with each device and store attributes appropriate to the customer's business.

The customer may associate a physical identity with each device. Alternatively, a composite identity may be created for each device that includes the physical identity imprinted by the manufacturer. That original physical identity imprinted by the manufacturer may serve as the basis for secure authentication, which may eliminate the need for special procedures surrounding imprinting that involve a new physical identity solely based on the customer requirements. The new composite identity may be given the authorization privileges needed for normal device operation within the customer's enterprise, whereas the original physical identity imprinted by the manufacturer may only have authorization to participate in the composite creation process. The original physical identity imprinted by the manufacturer may also be used when the customer has to interact with the manufacturer's customer service organization in the event of a device malfunction.

One approach to an identity chain scenario requires some cooperation between the manufacturer and the customer. For example, the identity service of the customer may collaborate with the identity service of the manufacturer to create the composite identity. The composite identity may be held in the customer's identity service. An alternative approach may be to provide a customer who purchases the devices from the manufacturer with the relevant portion of the identity database of the manufacturer to be maintained in the identity database of the customer.

The advantages of a composite identity also may be illustrated in the scenario described below. In this scenario, a parcel delivery company employs drivers who carry scanner devices. Each scanner device is permanently associated with an identity that is imprinted on the device. The scanner device is associated with attributes, including the make, model, serial number, and date purchased. A scanner device is not permanently assigned to a particular driver. Instead, a driver uses a scanner device that the driver selects at the beginning of a delivery run. The driver logs into the scanner and the scanner authenticates the name and password of the driver. For the remainder of the delivery run, each action the driver takes using the scanner device is associated with the name of the driver and the scanner device identifier.

This scenario uses a physical identity, a virtual identity, and a composite identity. The physical identity is the identity associated with the scanner device itself. The virtual identity is the identity of the driver. The composite identity is the combination of the scanner device (which is a physical identity) and the driver (which is a virtual identity).

A well-known identity refers to an identity that the ICL needs for proper operation. Well-known identities may be allocated from a reserved portion of the UID namespace, which provides that the meaning of a particular reserved UID is the same in every realm.

Some implementations may include a historical archive of identities and attribute values, particularly when historical databases of device data are being kept. An implementation may include an identity historical archive that stores a permanent record of device attributes as the attributes existed at some, or any, point in time. A record is stored in the identity historical archive for each change that is made to an attribute of an identity. When a new identity is created, a record is stored in the identity historical archive. The identity historical archive records also include the date and time when the record was created.

Figure 8:
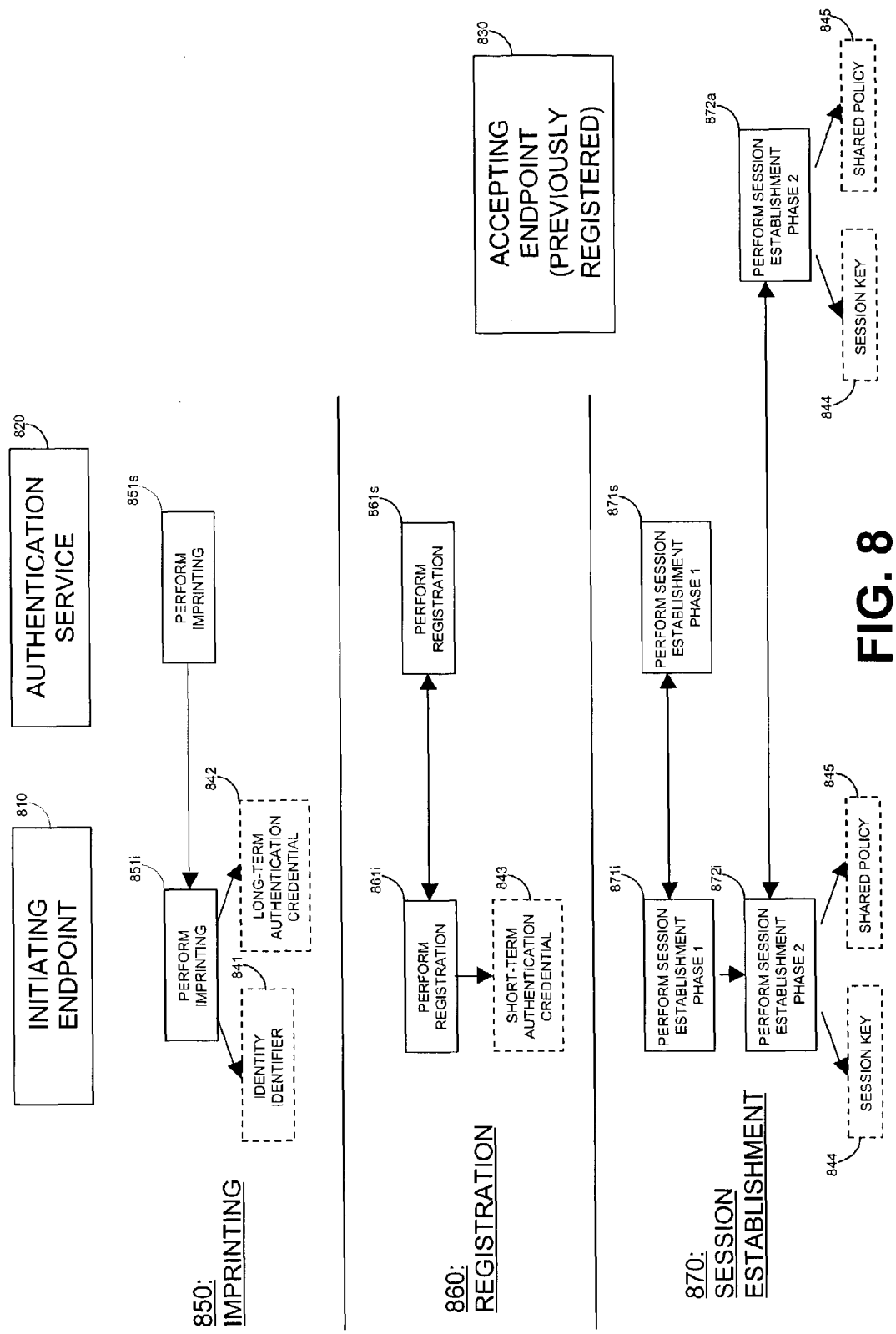
FIG. 8 is a block diagram showing an imprinting process, a registration process, and a session establishment process.

The authentication of an identity may involve three processes illustrated in FIG. 8. The first of these is an imprinting process 850 for imprinting an identity into an endpoint 810. The initiating endpoint 810 performs a portion of the imprinting process (step 851$i$), as does the authentication service 820 (step 851$s$). In one implementation, an initiating endpoint 810 may send a request for imprinting to the authentication service 820. The request may include, for example, an identifier for the initiating endpoint 810. In another implementation, a human administrator interacting directly with the authentication service 820 may request that the initiating endpoint 810 be imprinted. When the authentication service 820 receives the request to imprint the initiating endpoint 810, the authentication service 820 associates the initiating endpoint 810 with an identity identifier and sends the identity identifier to the initiating endpoint 810. The authentication service 820 also sends to the initiating endpoint 810 a long-term authentication credential that encapsulates a secret shared between the endpoint 810 and an authentication service 820. The initiating endpoint 810 receives and stores both the identity identifier 841 and the long-term authentication credential 842.

For a physical identity, the imprinting process is typically performed once for an endpoint, and imbues (or otherwise associates) an endpoint with a physical identity. When an endpoint is to have more than one physical identity, then the imprinting process 850 is performed once for each physical identity. The creation of a composite identity is another form of imprinting. Regardless of the type of identity imprinted, at the conclusion of the imprinting process 850, the endpoint 810 possesses an identity identifier 841, and a long-term authentication credential 842 that encapsulates a secret shared between the endpoint 810 and an authentication service 820.

The second process is a registration process 860 in which an endpoint 810, having been previously imprinted, registers with the authentication service 820. The initiating endpoint 810 performs a portion of the registration process (step 861$1$), as does the authentication service 820 (step 861$s$). Typically, an initiating endpoint 810 sends a request for registration to the authentication service 820. The request for registration may include the identity identifier for the initiating endpoint 810. The authentication service 820 then sends to the initiating endpoint 810 a short-term authentication credential that encapsulates a secret shared between the endpoint 810 and an authentication service 820. The initiating endpoint 810 receives and stores the short-term authentication credential 843.

Unlike the long-term authentication credential, however, the secret encapsulated in the short-term authentication credential 843 is valid only for the duration of the registration which may be, for example until the device is powered down, or until a pre-established expiration period elapses. As an optional part of the registration process 860, the endpoint 810 may advertise its physical address to the authentication service 820. This may be carried out with the aid of a presence and availability service such as the ICL presence and availability service (item 385 in FIG. 3). In carrying out the registration process, the authentication service 820 may consult a policy service such as the ICL policy service (item 395 in FIG. 3) to determine if the endpoint identity 810 is authorized to register and/or advertise its physical address. The registration process 860 involves a mutual authentication between the endpoint 810 and the authentication service 820 that uses the long-term authentication credential previously established by the imprinting process 850.

Typically, the registration process 860 is performed many times over the lifetime of an endpoint, such as each time a physical device powers up, or when a composite identity is created, or after a previous registration has expired. At the conclusion of the registration process 860, the endpoint 810 possesses a short-term authentication credential 843 that encapsulates a secret shared between the endpoint 810 and an authentication service 820.

The third process is a session establishment process 870 in which an initiating endpoint 810, having previously registered, establishes a communication session with an accepting endpoint 830, which has also previously registered. At the conclusion of the session establishment process 870, the initiating endpoint 810 and the accepting endpoint 830 are each in possession of a session key 844. The session key 844 is a secret shared between the two endpoints and is valid for the current session only. The session key may subsequently be used by the two endpoints to encrypt their communication and to create data integrity checks. The initiating endpoint 810 and the accepting endpoint 830 may also each be in possession of policy information 845 specified by the authentication service 820 for use in governing the subsequent communication between the endpoints. Examples of policy information include whether to encrypt the subsequent communication, whether to employ data integrity checks in the subsequent communication, and the particular algorithms to employ for these operations.

Broadly speaking, the session establishment process 870 is carried out in two phases. In the first phase, the initiating endpoint 810 and the authentication service 820 mutually authenticate one another and the initiating endpoint 810 receives authentication material from the authentication service 820. In the second phase, the initiating endpoint 810 uses the received authentication material to establish a communication session with the accepting endpoint 830.

More specifically, the first phase of the session establishment process 870 includes a mutual authentication between the endpoint 810 and the authentication service 820 (steps 871*i* and 871*s*). The initiating endpoint 810 communicates with the authentication service 820 to indicate a desire to communicate with an accepting endpoint 830. The authentication service 820 also provides the initiating endpoint 810 with a session key 844. In some implementations, the authentication service 820 also may provide policy information 845. In carrying out the first phase of the session establishment process, the authentication service 820 may consult a policy service, such as the ICL policy service 395 in FIG. 3, to determine if the endpoint identity 810 is authorized to communicate with the accepting identity 830, and/or to determine what policy information applies to the session.

In some implementations, the authentication service 820 may provide the initiating endpoint 810 two copies of the session key. One copy of the session key may be encrypted using the short-term authentication credential 843 of the initiating endpoint 810 and may be used by the initiating endpoint. The other copy of the session key may be encrypted using either the short-term authentication credential or the long-term authentication credential of the accepting endpoint 830 and may be used by the accepting endpoint 830. This may help to protect the session key from being used by unauthorized parties. This also may prevent the initiating endpoint 810 from tampering with the session key information before the session key is received by the accepting endpoint 830.

Similarly, the authentication service 820 may provide the initiating endpoint 810 two copies of the policy information. One copy of policy information may be encrypted using the short-term authentication credential 843 of the initiating endpoint 810, and the other copy of policy information may be encrypted using either the short-term authentication credential or the long-term authentication credential of the accepting endpoint 830. This may help to protect the policy information from being used by unauthorized parties. This also may prevent the initiating endpoint 810 from tampering with the policy information before the policy information is received by the accepting endpoint 830.

The second phase of the session establishment process 870 (steps 872*i* and 872*a*) involves a mutual authentication between the initiating endpoint 810 and the accepting endpoint 830. The mutual authentication in the second phase makes use of the session key 844.

In the second phase of the session establishment process 870, the initiating endpoint 810 delivers to the accepting endpoint 830 the session key 844 and the policy information 845 obtained from the authentication service 820 during the first phase.

Specific implementations of the session establishment process 870 may include, in either the first phase or the second phase or both, additional messages not explicitly indicated in FIG. 8. For example, if the short-term authentication credential of the accepting endpoint 830 is used by the authentication service 820 to encrypt the session key 844 for delivery to the accepting endpoint 830, additional messages may be used so that the initiating endpoint 810 can obtain the credential from the accepting endpoint 830 and relay it to the authentication service 820.

The registration process 860 and the session establishment process 870 both involve the authentication of one party to another. For example, in the registration process 820, the endpoint 810 authenticates itself to the authentication service 820, and the authentication service 820 likewise authenticates itself to the endpoint 810. When one party authenticates itself to another party, it may do so using a challenge and response protocol. In general, a challenge and response protocol is an authentication approach in which an entity sends a nonce (a non-repeatable number) that the recipient cryptographically modifies using a shared key and returns to the challenger. The challenger authenticates the recipient by confirming that the modified nonce has the correct value. In one implementation, the shared key may be a single key that is known only by the two parties to the authentication, where the operation of cryptographically modifying the nonce uses a symmetric cryptographic algorithm. In another implementation, the shared key may take the form of a public/private key pair, where the private key is known only to the recipient and the public key is known by the challenger (though not necessarily exclusively by the challenger). In this implementation, the operation of cryptographically modifying the nonce uses an asymmetric (public key) cryptographic algorithm. In any case, the challenge and response protocol confirms the identity of the recipient because the recipient is presumed to be the only entity in possession of the necessary key to produce a correct response. The significance of the non-repeatability of the nonce is to protect against a "replay attack," in which an unauthorized party uses a response intercepted from a prior run of the challenge and response protocol to masquerade as the authentic recipient.

In one implementation, a nonce may be a large random number. In another implementation, a nonce may be a sequence number. In yet another implementation, a nonce may be a timestamp derived from the current date and time. When a timestamp is used, and both parties may be assumed to have synchronized clocks, the challenge and response protocol may be implemented without the challenger explicitly sending the nonce to the recipient, because the recipient may presume the nonce to be the current timestamp. Many of the applications for which the ICL may be used, however, employ network devices that do not include a real-time clock, and therefore the use of random number or sequence number nonces may be preferred.

The session establishment process 870 may be readily combined with the communication process 400 of FIG. 4. The first phase of the session establishment process 870 (steps 871*i* and 871*s* of FIG. 8) may be combined with steps 430*ii* through 440*ii* of FIG. 4. In this combination, the authentication service 820, in addition to its responsibilities with respect to FIG. 8, also performs the translation of the acceptor identity to a physical address, corresponding to step 435*pa* of FIG. 4. Likewise, the second phase of the session establishment process 870 (steps 872*i* and 872*a* of FIG. 8) may be combined with steps 450*ii* through 470*ia* of FIG. 4. In this combination, once the physical connection has been established between the two endpoints (that is, following step 470*ii* of FIG. 4), messages are exchanged between the two endpoints to carry out the second phase of session establishment (steps 872*i* and 872*a* of FIG. 8). The session key 844 and policy information 845 obtained from the second phase of session establishment may then be used by the ICL to perform additional computation or checks (such as encryption/decryption and using message authentication codes (MACs)) during application communication (steps 480*ia*, 480*ii*, 480*in*, 480*an*, 480*ai*, and 480*aa* of FIG. 4).

Figure 9:
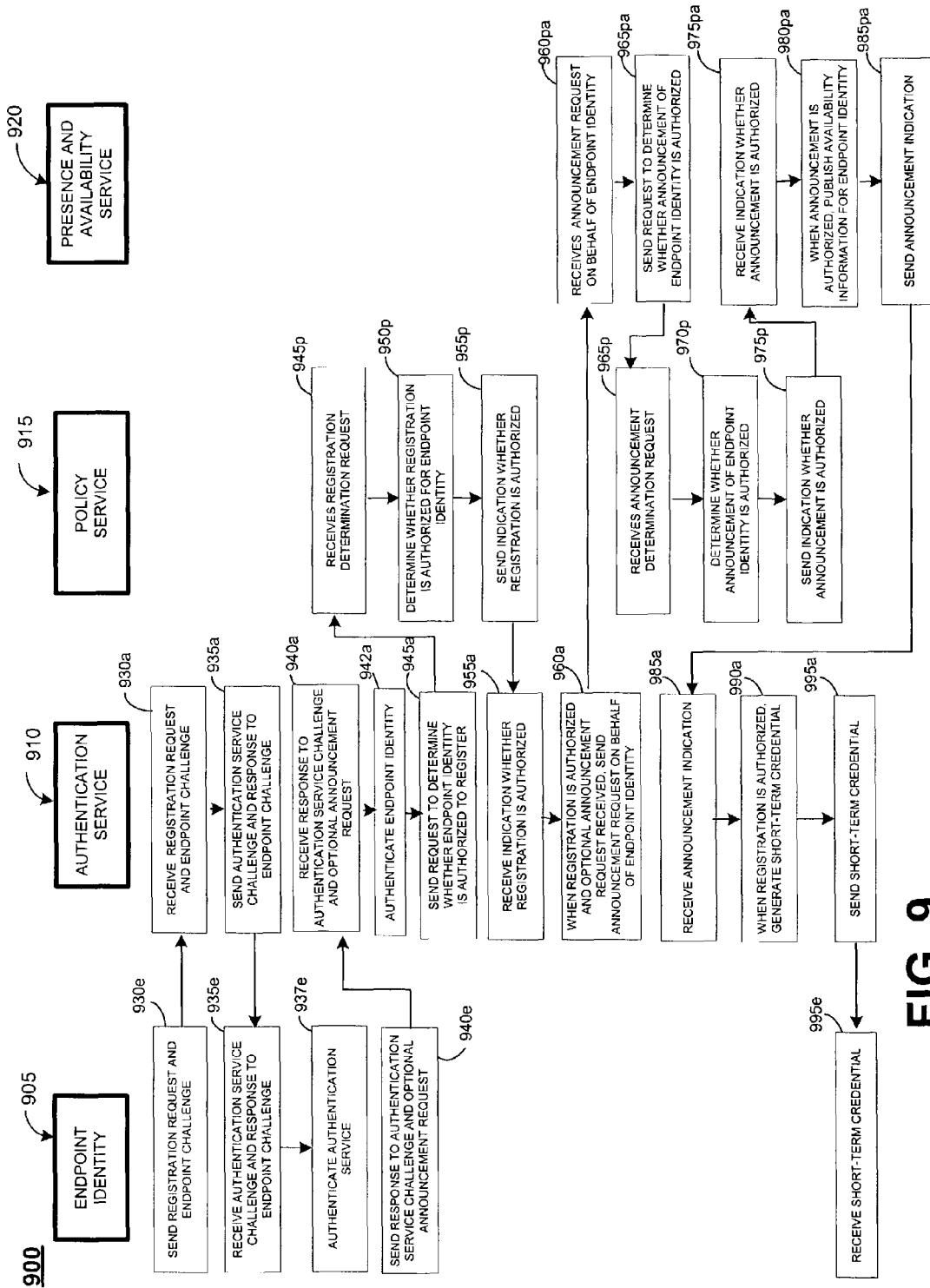
FIG. 9 is a block diagram illustrating communications between an endpoint identity, an authentication service, a policy service, and a presence and availability service to register the endpoint identity.

FIG. 9 shows a process 900 for communicating between an endpoint identity 905, an authentication service 910, a policy service 915, and a presence and availability service 920 to register the endpoint identity 905. This process is an example of the registration process 860 of FIG. 8. Once registered, an endpoint identity may establish connections with other another identity using the ICL. Optionally, the endpoint identity 905 may register with the presence and availability service 920 to announce the presence of the endpoint identity 905 on the network. Announcement allows the endpoint identity 905 to accept ICL sessions (in addition to initiating ICL sessions).

Typically, an endpoint identity that is a physical identity, such as a device, requests registration when the physical identity powers up. An endpoint identity also may be registered in other situations, such as when a composite identity is created, or upon determining that the current short-term authentication credential of the endpoint identity has either expired, or is close to expiring. The endpoint identity 905 may be a physical identity, such as a device (e.g., device 110, 115, 120 or 125 of FIGS. 1 and 2) or an enterprise server, such as enterprise application 105 of FIGS. 1 and 2. The endpoint identity 905 also may be a composite identity, such as a user logged into a particular device. The authentication service 910 may be an authentication service of the ICL, such as authentication service 380 of FIG. 3. The policy service 915 may be a policy service of the ICL, such as policy service 395 of FIG. 3. The presence and availability service 920 may be a presence and availability service of the ICL, such as the presence and availability service 385 of FIG. 3.

The registration process begins when the endpoint identity 905 sends to the authentication service 910 a registration initiate message (step 930*e*). The registration initiate message also may be referred to as a registration request. The registration initiate message includes an identity identifier associated with the endpoint identity 905 and a nonce challenge. The nonce challenge may be referred to as an endpoint challenge. The registering endpoint identity 905 may also attach a message authentication code (MAC) to the registration initiate message, using the endpoint identity's long-term authentication credential.

The authentication service 910 receives the registration initiate message and endpoint challenge (step 930*a*). If the registration initiate message includes a MAC, the authentication service 910 verifies the attached MAC. This may confirm the authenticity and integrity, though not the freshness, of the received message.

The authentication service 910 sends a registration authentication challenge message to the registering endpoint identity (step 935*a*). The registration authentication challenge message includes a response to the challenge received from the endpoint identity 905, and a new nonce challenge generated by the authentication service 910. In one implementation, the response to the challenge received from the endpoint identity 905 may be implemented by including the nonce received in step 930*a* together with a MAC derived using the long-term authentication credential of the registering endpoint identity 905. The identity identifier of the endpoint identity 905 also may be included in the registration authentication challenge message.

The registering endpoint identity 905 receives the registration authentication challenge message and the response to the endpoint challenge (step 935*e*). The registering endpoint identity 905 authenticates the authentication service 910 by verifying the response to the endpoint identity's original challenge (step 937*e*). When the response is implemented using a MAC, the authentication also may verify the authenticity and integrity of the registration authentication challenge message itself. When the authentication service 910 fails to respond successfully to the challenge (e.g., the endpoint identity 905 receives an incorrect response or does not receive a response at all), the endpoint identity 905 terminates the process 900.

When the endpoint identity 905 receives a correct response from the authentication service 910, the registering endpoint identity 905 then responds by sending a registration authentication response message to the authentication service 910 (step 940*e*). The registration authentication response message includes a response to the challenge received from the authentication service 910. In addition, if the registering endpoint identity intends to accept ICL communication sessions (in addition to or as opposed to initiating ICL sessions), the registering endpoint identity includes an optional announcement request in the registration authentication response message. The announcement request includes the registrant's physical address. The physical address may take the form of an ICL global address (such as data structure 500 in FIG. 5). In one implementation, the response to the challenge received from the authentication service 910 may be accomplished by including the nonce received in step 935*e* together with a MAC derived using the long-term authentication credential of the registering endpoint identity 905. The identity identifier of the endpoint identity 905 and the two nonces used up to this point also may be included in the registration authentication response message.

The authentication service 910 receives the registration authentication response message (step 940*a*). The authentication service 910 authenticates the endpoint identity 905 by verifying the response to the authentication service's original challenge (step 942*a*). When the response is implemented using a MAC, the authentication also may verify the authenticity and integrity of the registration authentication response message itself. When the registering endpoint identity 905 fails to respond successfully to the challenge (e.g., the authentication service 910 receives an incorrect response or does not receive a response at all), the authentication service 910 terminates the process 900. When the authentication service 910 receives from the endpoint identity 905 a correct registration authentication response message, the authentication service 910, sends a request to the policy service 915 to determine whether the endpoint identity 905 is authorized to register (step 945*a*). The policy service 915 receives the registration authorization request (step 945*p*). The policy service 915 then determines whether registration is authorized for the endpoint identity (step 950*p*). This may be accomplished, for example, when the policy service 915 accesses policy information, such as the policy database 345 of FIG. 3, that specifies rules for determining whether a given endpoint identity may be registered. In one implementation, the policy service 915 accesses identity information, such as the identity database 340 of FIG. 3, to determine a policy role for each identity, and then uses that role to evaluate policy rules that specify what roles are permitted to register. The policy service 915 sends to the authentication service 910 an indication as to whether registration is authorized for the endpoint identity 905 (step 955*p*).

The authentication service 910 receives the indication as to whether registration is authorized for the endpoint identity 905 (step 955*a*). When registration is not authorized, the authentication service 910 may send a notification message to the endpoint identity 905 that indicates that the endpoint identity 905 is not permitted to register.

When registration is authorized and an optional announcement request from the endpoint identity 905 has been received, the authentication service 910 sends an announcement request on behalf of the endpoint identity 905 to the presence and availability service 920 (step 960*a*).

The presence and availability service 920 receives the announcement request on behalf of the endpoint identity 905 (step 960*pa*). The presence and availability service 920 then sends to the policy service 915 a request to determine whether announcement of the endpoint identity 905 is authorized (step 965*pa*).

The policy service 915 receives the announcement determination request (step 965*p*) and determines whether announcement of the endpoint identity 905 is authorized (step 970*p*). This may be accomplished, for example, when the policy service 915 accesses policy information, such as the policy database 345 of FIG. 3, that specifies what types of devices may be announced and determines whether the endpoint identity may be announced. The policy service 915 sends to the presence and availability service 920 an indication as to whether announcement is authorized for the endpoint identity 905 (step 975*p*).

The presence and availability service 920 receives the indication as to whether announcement is authorized for the endpoint identity 905 (step 975*pa*). When announcement is authorized, the presence and availability service 920 publishes availability information for the endpoint identity 905 (step 980*pa*). The availability information may include, for example, an identity identifier and a physical address. The publication of availability information for the endpoint identity may be accomplished, for example, by updating presence and availability information, such as the presence and availability database 335 of FIG. 3, in a manner such that another identity may access the presence and availability information using the identity communication layer. Another identity may use the presence and availability information to establish an ICL session with the endpoint identity 905. The availability service 920 sends to the authentication service 910 an announcement indication as to whether the announcement is authorized for the endpoint identity 905 (step 985*pa*). The format of this announcement indication may be the same as or different from the announcement indication received from the policy service 915.

The authentication service 910 receives the announcement indication (step 985*a*). When announcement is not authorized, the authentication service 910 sends to the endpoint identity 905 a notification that the registration process failed and terminates the process 900. In other words, the endpoint identity 905 fails registration when the endpoint identity 905 requests a presence and availability announcement for which the endpoint identity 905 is not authorized. The endpoint identity 905 fails registration even when the endpoint identity 905 has been successfully authenticated and is authorized to be registered. However, in some implementations, the endpoint identity 905 may be registered even when the endpoint identity 905 requests announcement and is not so authorized.

When the registering endpoint identity 905 is successfully authenticated and authorized for registration, and when, in the event that an announcement request accompanied the registration and the announcement request succeeded, the authentication service 910 generates a short-term authentication credential for the endpoint identity 905 (step 990*a*). The short-term authentication credential may be used to establish a secure session with another endpoint over the ICL (such as through the process 870 of FIG. 8). The short-term authentication credential may be referred to as an ICL authentication credential. The short-term authentication credential includes wrapped (serialized and encrypted) and unwrapped portions. The unwrapped portion may contain a short-term authentication key and a credential lifetime. The wrapped portion is encrypted with a secret key known only to the authentication service, and may include the same short-term 10 authentication key as in the credential's unwrapped portion, the registrant's identity identifier, the time-of-issue of the short-term authentication credential, and/or the credential's lifetime. The wrapped portion may be referred to as the registrant's "ticket granting ticket."

The ticket granting ticket may permit the registering endpoint identity 905 and the authentication service 910 to share a short-term authentication key, without the authentication service 910 needing to maintain state information for a registered endpoint. Instead, the endpoint identity 905 maintains the state on behalf of the authentication service 910, by maintaining the ticket granting ticket as part of short-term authentication credential of the endpoint identity 905. When, in a subsequent operation, the authentication service 910 may require access to the short-term authentication key in order to complete an authentication operation, the endpoint identity 905 provides the key to the authentication service by sending a copy of the ticket granting ticket. Because the ticket granting ticket is encrypted using a key known only to the authentication service 910, the endpoint identity 905 is unable to tamper with the ticket granting ticket. Relieving the authentication service 910 from maintaining state information for registered endpoints may help to improve the scalability of the system.

The authentication service 910 sends the short-term authentication credential to the registering endpoint entity 905 in a registration response message (step 995*a*). The registration response message includes a portion encrypted with a key derived from the registrant's long-term authentication key. The encrypted portion of the registration response message includes at least the short-term authentication key within the unwrapped portion of the short-term authentication credential. This may help ensure the confidentiality of the short-term authentication key during message transit. The registration response message may also include the registrant's identifier, the registrant's nonce, the authentication service's nonce and a MAC derived using the long-term authentication credential of the registering endpoint 905.

The registering endpoint identity 905 receives the registration response message (step 995*e*). When the registration response message contains a MAC, the registering endpoint identity 905 verifies the integrity of the message contents using the MAC. Due to the presence of the registrant's nonce in the message, MAC verification asserts the integrity, authenticity and freshness of the registration response. If the registration response message is correct, the endpoint identity 905 extracts the short-term authentication credential. The endpoint identity 905 may subsequently use the short-term authentication credential to establish an ICL session.

During the registration process 900, the communication between the endpoint identity 905 and the authentication service 910 uses unsecured ICL relay sessions (which may, for example, correspond to the global address layer 615 and 625 in FIG. 6) in which the endpoint identity 905 and the authentication service 910 are identified by their network global addresses (and not by ICL identities). The communications between the authentication service 910, the policy service 915, and the presence and availability service 920 use secure ICL sessions that use ICL identities.

FIGS. 10A and 10B depict a process 1000 where a session initiator 1005 establishes a secure ICL communications session with a session acceptor 1025. This process is an example of the session establishment process 870 of FIG. 8. In general terms, process 1000 is a three-party, mediated authentication protocol where mutual authentication of session initiator and acceptor is achieved through the participation of the authentication service 1010. In addition to mediating the mutual authentication of initiator and acceptor, the authentication service 1010 blocks the establishment of unauthorized sessions and securely distributes policy-derived session parameters to both initiator and acceptor. Session parameters may include keying material such as a session key, and quality-of-protection parameters such as whether the initiator and acceptor should use encryption when communicating with each other, what encryption algorithm to use, and whether to use message authentication code (MAC) integrity checks. The authentication service 1010 collaborates with the policy service 1015 and presence and availability service 1020 when engaged in the session establishment process 1000. The authentication service 1010 also may, in some implementations, collaborate with an identity service.

The process 1000 begins when the session initiator 1005 sends to the authentication service 1010 a session initiate message (step 1030si). The session initiate message includes an identity identifier associated with the session initiator 1005, a nonce challenge, and the ticket granting ticket associated with the session initiator 1005. The ticket granting ticket may have been previously provided by the authentication service 1010 or other security management facility, such as by using process 900 described previously with respect to FIG. 9. The ticket granting ticket may include the short-term authentication credential associated with the session initiator 1005. The ticket granting ticket also may indicate the identity of the session initiator 1005, such as by including an identity identifier for the session initiator 1005, the time that the ticket granting ticket was issued to the session initiator 1005, and a lifetime for the ticket granting ticket. The contents of the ticket granting ticket may be encrypted (or wrapped) with the secret key of the authentication service 1010. The session initiator 1005 also may attach a message authentication code (MAC) to the session initiate message using the session initiator's short-term authentication credential.

The authentication service 1010 receives the session initiate message (step 1030a). The authentication service 1010 decrypts the ticket granting ticket contained in the session initiate message to extract a copy of the short term authentication credential associated with the session initiator 1005, the time-of-issue of the credential, and the credential's lifetime (step 1035a). If the session initiate message contains a MAC, the authentication service 1010 verifies the attached MAC using the short-term authentication credential extracted from the ticket granting ticket. This may confirm the integrity and authenticity of the received message.

The authentication service 1010 inspects the time-of-issue and lifetime to determine the freshness of the ticket granting ticket (step 1035a). When the lifetime has expired, the authentication service 1010 terminates the process 1000. When the authentication service 1010 terminates the process 1000, the authentication service 1010 also may send to the session initiator 1005 a message to inform the session initiator 1005 of the expiration of the ticket granting ticket.

When the ticket granting ticket is judged to be authentic and fresh, the authentication service 1010 responds by sending a session authentication challenge message to the session initiator (step 1040a). The session authentication challenge message includes a response to the challenge received from the session initiator 1005, and a new nonce challenge generated by the authentication service 1010. In one implementation, the response to the challenge received from the session initiator 1005 may be implemented by including the nonce received in step 1030a together with a MAC derived using the short-term authentication credential of the session initiator 1010. The identity identifier of the session initiator 1005 also may be included in the session authentication challenge message.

The session initiator 1005 receives the session authentication challenge message (step 1040si). The session initiator 1005 authenticates the authentication service 1010 by verifying the response to the session initiator's original challenge (step 1045si). When the response is implemented using a MAC, the authentication may also verify the authenticity and integrity of the session authentication challenge message itself. When the authentication service 1010 fails to respond successfully to the challenge (e.g., the session initiator 1005 receives an incorrect response or does not receive a response at all), the session initiator 1005 terminates the process 1000.

When the session initiator 1005 receives a correct response from the authentication service 1010, the session initiator 1005 then responds by sending to the authentication service 1010 a session authentication response message (step 1050si). The session authentication response message includes a response to the challenge received from the authentication service 1010 and an identity identifier associated with the session acceptor 1025. In one implementation, the response to the challenge received from the authentication service 1010 may be accomplished by including the nonce received in step 1040si together with a MAC derived using the short-term authentication credential of the session initiator 1005. The identity identifier of the session initiator 1005 and the session initiator's nonce also may be included in the session authentication response message. In some implementations, a hierarchical name for the session acceptor 1025 may be included in the authentication response message, as opposed to an identity identifier.

The authentication service 1010 receives the session authentication response message (step 1050a) and authenticates the session initiator 1005 (step 1051a). The authentication service 1010 authenticates the session initiator 1005 by verifying the response to the authentication service's original challenge, which may include a MAC for verifying the authenticity and integrity of the session authentication response message itself. When the session initiator 1010 fails to respond successfully to the challenge (e.g., the authentication service 1010 receives an incorrect response or does not receive a response at all), the authentication service 1010 terminates the process 1000.

When the authentication service 1010 receives from the session initiator 1010 a correct session authentication response message, the authentication service 1010 sends to the policy service 1015 an authorization determination request to determine whether the session initiator 1010 is authorized to initiate a session with the session acceptor 1025 (step 1052*a*). The request includes the identity identifier of the session initiator 1010 and the identity identifier of the session acceptor 1025.

In some implementations, when the authentication response message includes a hierarchical name for the session acceptor 1025 instead of an identity identifier, the authentication service 1010 may have to query an identity service, such as identity service 390 of FIG. 3, for the identity identifier associated with the hierarchical identifier of the session acceptor 1025. The identity service may access the identity identifier for a provided hierarchical identifier thorough the use of an identity database, such as the identity database 340 of FIG. 3, that associates an identity identifier with a corresponding hierarchical identifier. Once the authentication service 1010 receives the identity identifier of the session acceptor 1025, the authentication service 1010 may proceed as though the identity identifier were received directly in the authentication response message.

After the authentication service 1010 sends the session authorization determination request to the policy service 1015 (step 1052*a*), the policy service 1015 receives the authorization determination request (step 1052*p*) and determines whether the session initiator 1005 is authorized to establish a session with the identified session acceptor (step 1054*p*). This may be accomplished, for example, when the policy service 1015 accesses policy information, such as the policy database 345 of FIG. 3, that specifies the rules for determining whether a specified endpoint identity is permitted to establish a session with a second specified endpoint identity. In one implementation, the policy service 915 accesses identity information, such as the identity database 340 of FIG. 3, to determine a policy role for each identity, and then uses those roles to evaluate policy rules that specify what roles are permitted to establish sessions with what other roles. The policy service 1015 sends to the authentication service 1010 an indication as to whether a session between the session initiator 1005 and the session acceptor 1025 is authorized (step 1056*p*).

The authentication service 1010 receives the indication as to whether the session is authorized (step 1056*a*). If the session is not authorized, the authentication service 1010 terminates the process 1000. When the session is authorized, the authentication service then sends to the presence and availability service 1020 a request for the address of the identified session acceptor (step 1058*a*).

The presence and availability service 1020 receives the address request (step 1058*pa*) and determines the address of the identified session acceptor (step 1060*pa*). This may be accomplished, for example, when the presence and availability service 1020 accesses presence and availability information, such as the presence and availability database 335 of FIG. 3, that specifies an address associated with an identity.

The presence and availability service 1020 sends to the authentication service 1010 the address of the session acceptor (step 1062*pa*). The authentication service 1010 receives the address of the session acceptor 1025 and sends to the session initiator the session acceptor address message (step 1062*a*). The session acceptor address message includes the address of the session acceptor 1025 received from the presence and availability service 1020. The session acceptor address message may also include the identity identifier of the session initiator 1005, the identity identifier of the session acceptor 1025, the session initiator's nonce, the authentication service's nonce, and a message authentication code (MAC) derived using the session initiator's short-term credential. The session initiator 1005 receives the session acceptor address message (step 1062*si*). When the session acceptor address message contains a MAC, the session initiator 1005 verifies the integrity of the message contents using the MAC. Due to the presence of the session initiator's nonce in the message, the MAC verification asserts the integrity, authenticity, and freshness of the session acceptor address message.

The session initiator 1005 then sends a session acceptor token request message to the session acceptor 1025 (step 1064*si*). The session acceptor token request message may indicate the desire of the session initiator 1005 to initiate a session with the session acceptor 1025. The session initiator 1005 may use the address of the session acceptor 1025 received in step 1062*si* in order to know where to send the session acceptor token request message. The session acceptor token request message may include the identity identifier of the session initiator 1005 and the identity identifier of the session acceptor 1025. The session acceptor token request message may also include the session initiator's nonce.

The session acceptor 1025 receives the token request message (1064*sa*) and responds by sending a session acceptor token response message (step 1065*sa*). The session acceptor token response message includes a nonce challenge generated by the session acceptor 1025, and the ticket granting ticket of the acceptor 1025. As described previously with respect to step 1030*si*, the session acceptor 1025 may receive a ticket granting ticket upon registering as an identity on the network capable of receiving communications. The nonce challenge may be wrapped (encrypted) using the short-term authentication credential of the session acceptor 1025. The wrapped nonce challenge may further include the identity identifier of the session initiator 1005, the identity identifier of the session acceptor 1025, and a cryptographic hash of the two identity identifiers and the nonce challenge. All of these wrapped components, considered collectively, may be referred to as the "acceptor token." In addition to the acceptor token and the ticket granting ticket of the session acceptor 1025, the session acceptor token response message may include the identity identifier of the session initiator 1005, the identity identifier of the session acceptor 1025, and the session initiator's nonce.

The session initiator 1005 receives the session acceptor token response message (step 1065*si*). The session initiator 1005 sends to the authentication service 1010 a session credential request message (step 1070*si*). The session credential request message includes the ticket granting ticket of the session acceptor 1025. The message may also include the session acceptor's nonce challenge wrapped using the session acceptor's short-term authentication credential. In one implementation, the nonce challenge may be included as part of an acceptor token, which the session initiator 1005 extracts from the session acceptor token response message. The session credential request message may also include the identity identifier of the session initiator 1005, the identity identifier of the session acceptor 1025, the initiator's nonce, the authentication service's nonce, and a message authentication code (MAC) derived using the short-term authentication credential of the session initiator 1005.

The authentication service 1010 receives the session credential request message (step 1070*a*). When the session credential request message contains a MAC, the authentication service 1010 verifies the integrity of the message contents using the MAC. As noted above, the presence of the session acceptor's nonce in the message permits MAC verification to assert the integrity, authenticity and freshness of the session credential request. The authentication service 1010 decrypts the ticket granting ticket of the session acceptor 1025 (and, in the course of decrypting the ticket, verifies its integrity and authenticity) to extract the acceptor's short-term authentication credential (step 1071*a*). The authentication service 1010 also inspects the ticket granting ticket's "time-of-issue" and lifetime to determine the freshness of the ticket granting ticket (step 1071*a*). When the lifetime has expired, the authentication service 1010 terminates the process 1000, and the authentication service 1010 also may send a message to the session initiator 1005 and/or to the session acceptor 1025 to indicate that the session acceptor's ticket granting ticket has expired.

When the ticket granting ticket is judged to be authentic, fresh, and unexpired, the authentication service 1010 sends session policy determination request to the policy service 1015 to determine policy information that applies to a communication session between the session initiator 1010 and the session acceptor 1025 (step 1072*a*). The policy service 1015 receives the session policy determination request (step 1072*p*) and determines what session policy settings apply to a session between the session initiator 1005 and the session acceptor (step 1073*p*). Session policy settings may include one or more of the settings described above. The determination of session policy settings may be accomplished, for example, when the policy service 1015 accesses policy information, such as the policy database 345 of FIG. 3, that specifies the rules for determining what policy settings apply when a specified identity establishes a session with a second specified identity. In one implementation, the policy service 1015 accesses identity information, such as the identity database 340 of FIG. 3, to determine a policy role for each identity, and then uses the determined roles to evaluate policy rules that specify what policy settings apply when one role establishes a session with a second role. The policy service 1015 sends to the authentication service 1010 the session policy settings that apply to a session between the session initiator 1005 and the session acceptor 1025 (step 1074*p*).

The authentication service 1010 receives the session policy settings from the policy service 1015 (step 1074*a*). The authentication service 1010 then creates a new session key (or other type of session credential) for the session between the session initiator 1005 and the session acceptor 1025, and unwraps the session acceptor's nonce that was previously received in the session credential request message (step 1075*a*). The authentication service 1010 sends a session credential response message to the session initiator 1005 (step 1080*a*). The session credential response message contains the unwrapped session acceptor's nonce, the policy settings, and the session key. These components may be wrapped (encrypted) using the short-term authentication credential of the session initiator 1005. The session credential response message may also include a second copy of the policy settings and the session key, wrapped (encrypted) using the short-term authentication credential of the session acceptor 1025 extracted from the session acceptor's ticket granting ticket. The portion that is encrypted using the short-term authentication credential of the session acceptor 1025 may additionally include any of the identity identifier of the session initiator 1005, the identity identifier of the session acceptor 1025, the session acceptor's nonce and/or a cryptographic hash of all wrapped components. All of the components that are wrapped using the short-term authentication credential of the session acceptor 1025, considered collectively, may be referred to as the "session ticket." In addition to the session acceptor's nonce, the policy settings, the session key, and the session ticket, the session credential response message may contain the identity identifier of the session initiator 1005, the identity identifier of the session acceptor 1025, the session initiator's nonce, the authentication service's nonce, and a message authentication code (MAC) derived using the short-term authentication credential of the session initiator 1005.

The session initiator 1005 receives the session credential response message (step 1080*si*). When the session credential response message contains a MAC, the session initiator 1005 verifies the integrity of the message contents using the MAC to assert the integrity, authenticity and freshness of the session credential request. The session initiator 1005 extracts the acceptor's nonce, the policy settings, and the session key from the session credential response message, decrypting the session key if necessary. The session initiator 1005 then sends to the session acceptor 1025 a session establishment request message (step 1085*si*). The session establishment request message includes a response to the challenge received from the session acceptor 1025, the session ticket, and the session initiator's nonce, which serves as a nonce challenge to the session acceptor 1025. In one implementation, the response to the challenge received from the session acceptor 1025 may be accomplished by including the nonce received in step 1080*si* together with a MAC derived using the session key (also received in step 1080*si*). In another implementation, in which the session initiator 1005 received in step 1065*si* the session acceptor's nonce in unencrypted form, the response to the challenge received from the session acceptor 1025 may be accomplished by including the unencrypted nonce received in step 1065*si* together with a MAC derived using the session key received in step 1080*si*. The session establishment request message may also include the identity identifier of the session initiator 1005 and the identity identifier of the session acceptor 1025.

The session acceptor 1025 receives the session establishment request message (step 1085*sa*). The session acceptor 1025 decrypts the session ticket, extracting the policy settings and the session key, and any other components included in the session ticket (step 1087*sa*). When the session ticket contains a cryptographic hash, the session acceptor 1025 verifies the integrity of the session ticket by verifying that the hash has the correct value. When the session ticket contains the session acceptor's nonce, this may further verify the freshness of the session ticket.

The session acceptor 1025 then authenticates the session initiator 1005 by verifying the response to the session acceptor's original challenge (step 1088*sa*). This verification may make use of the session key extracted from the session ticket. When the response is implemented using a MAC, this may also verify the authenticity and integrity of the session establishment request message itself. When the session initiator 1005 fails to respond successfully to the challenge (e.g., the session acceptor 1025 receives an incorrect response or does not receive a response at all), the session acceptor 1025 terminates the process 1000.

When the session acceptor 1025 receives a correct response from the session initiator 1005, the session acceptor 1025 then responds by sending a session establishment response message to the session initiator 1005 (step 1090*sa*). The session establishment response message includes a response to the challenge received from the session initiator 1005. In one implementation, the response to the challenge received from the session initiator 1005 may be accomplished by including the nonce received in step 1085*sa* together with a MAC derived using the session key (also received in step 1085*sa*). The session establishment response message may also include the identity identifier of the session initiator 1005, the identity identifier of the session acceptor 1025, and the session acceptor's nonce.

The session initiator 1005 receives the session establishment response message (step 1090*si*). The session initiator 1005 authenticates the session acceptor 1025 by verifying the response to the session initiator's challenge (step 1095*si*). When the response is implemented using a MAC, this may also verify the authenticity and integrity of the session establishment response message itself. When the session acceptor 1025 fails to respond successfully to the challenge (e.g., the session acceptor 1005 receives an incorrect response or does not receive a response at all), the session initiator 1005 terminates the process 1000.

When the session initiator 1005 receives a correct response from the session initiator 1025, the process 1000 has completed successfully. The session initiator 1005 and the session acceptor 1025 are able to securely communicate using the shared session key created by the authentication service 1010 and according to the shared policy settings delivered by the authentication service 1010.

Figure 11:
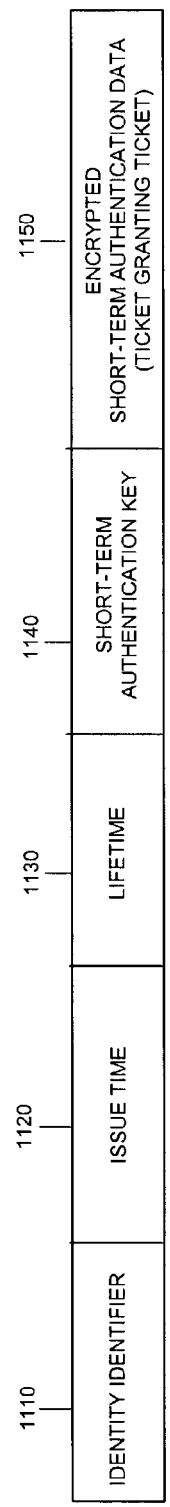
FIG. 11 is a block diagram showing a data structure used for a short-term authentication credential that is used by an identity to establish a communications session with another identity.

FIG. 11 illustrates an example data structure 1100 for a short-term authentication credential used by an identity to establish a communication session with another identity. The data structure 1100 includes an identity identifier 1110, an issue time 1120, a lifetime 1130, a short-term authentication key 1140, and encrypted short-term authentication data 1150. The encrypted short-term authentication data 1150 may be referred to as the "ticket granting ticket."

The identity identifier 1110 refers to an identifier that uniquely identifies the identity associated with the short-term authentication credential. The identity associated with the short-term authentication credential may be referred to as the credential holder.

The issue time 1120 refers to the time at which the short-term authentication credential was issued. The lifetime 1130 refers to the time during which the short-term authentication credential may be used. The lifetime 1130 may be expressed, for example, as a number of seconds measured from the issue time 1120. The lifetime 1130 also may be expressed as an expiration time after which the short-term authentication credential is no longer valid. The short-term authentication key 1140 refers to a short-term authentication key that may be used by the credential holder to perform tasks such as establishing a session.

The encrypted short-term authentication data 1150 refers to the result of encrypting the identity identifier 1110, the issue time 1120, the lifetime 1130, and the short-term authentication key 1140. The encrypted short-term authentication data 1150 may include the result of using the secret key of a centralized security facility, such as the authentication service 910 in FIG. 9, to encrypt the identity identifier 1110, the issue time 1120, the lifetime 1130, and the short-term authentication key 1140.

Figure 12:
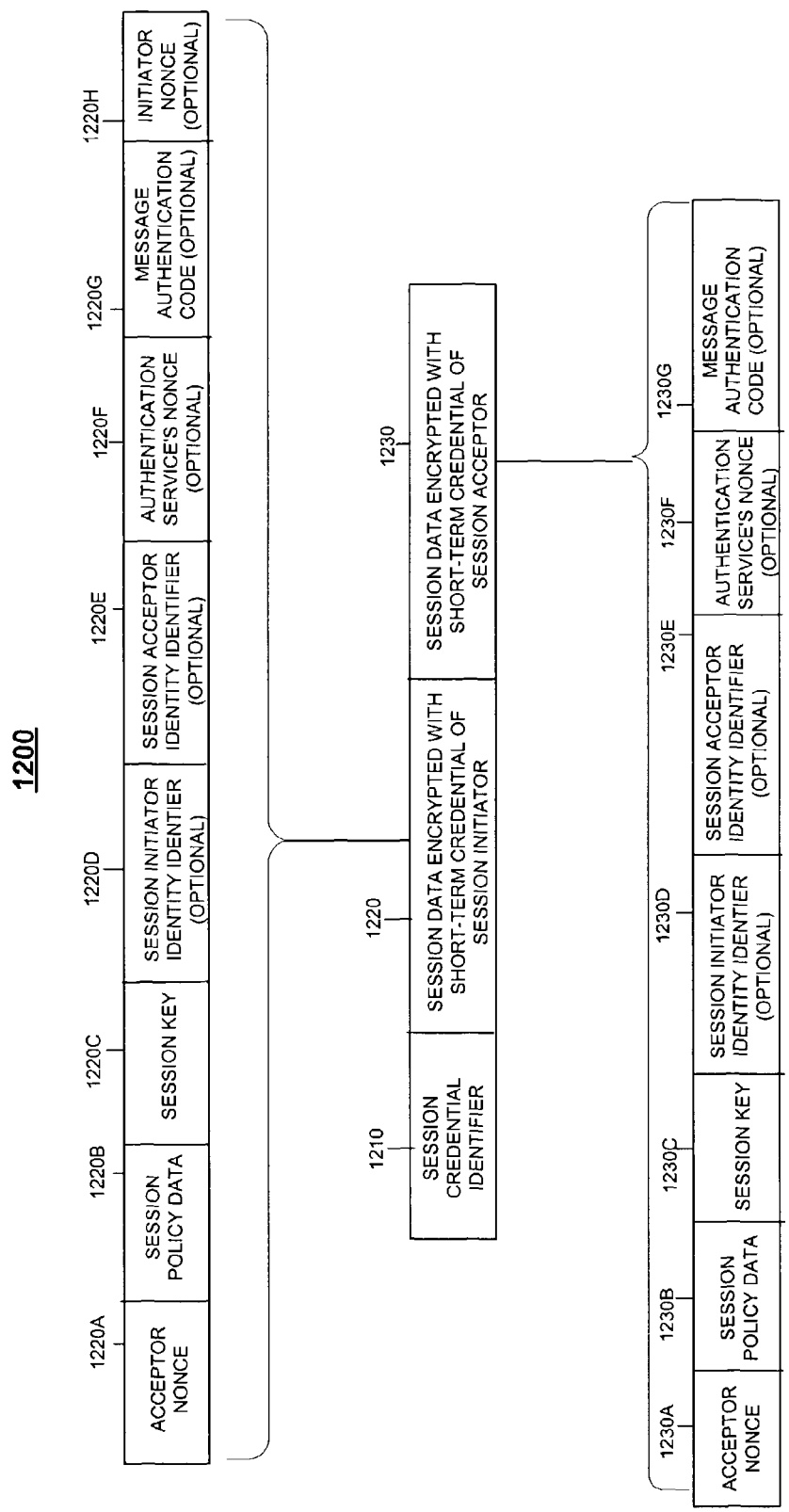
FIG. 12 is a block diagram illustrating a data structure for a session credential that is used by an identity to establish a communications session with another identity.

FIG. 12 shows an example of data structure 1200 for a session credential. The data structure 1200 includes a session credential identifier 1210, session data encrypted with the short-term authorization credential of the session initiator 1220, and session data encrypted with the short-term authorization credential of the session acceptor 1230.

The session credential identifier 1210 refers to an identifier that uniquely identifies the session credential that optionally may be included in the session credential 1200.

The session data 1220 or 1230 may include the acceptor nonce 1220A or 1230A, session policy data 1220B or 1230B, and a session key 1220C or 1230C or other type of session credential. The session data 1220 or 1230 optionally may include one or more the identity identifier of the session initiator 1220D or 1230D, the identity identifier of the session acceptor 1220E or 1230E, the nonce of the authentication service 1220F or 1230F, a message authentication code 1220G or 1230G, and the nonce of the session initiator 1220H. The session data encrypted with the short-term authentication credential of the session initiator 1220 may be the same as, or may be different from, the session data encrypted with the short-term authentication credential of the session acceptor 1230.

The acceptor nonce 1220A or 1230A refers to the nonce (e.g., a single-use random number) provided, for example by the session acceptor in conjunction with the session-acceptor challenge during a session establishment procedure, such as described by step 1065*sa* of FIG. 10A.

The session policy data 1220B or 1230B may include, for example, information about security requirements, quality requirements, or other types of requirements to govern the session. For example, session policy data 1220B or 1230B may include an indication as to whether message authentication is required, an indication as to whether message integrity is required, an indication as to whether message confidentiality is required, an indication as to whether message replay detection is required, and a network performance parameter, such as a quality of service (QoS) parameter, and a quality of performance (QoP) parameter. The quality parameters may be established, for example, by a central or decentralized security management facility, such as the policy service 395 of FIG. 3, the policy service 915 of FIG. 9, or the policy service 1015 of FIGS. 10A and 10B.

The session key 1220C or 1230C refers to a session key that may be used during a session to which the session credential 1200 applies. The session key may be generated by an authentication service, such as authentication service 330 of FIG. 3, authentication service 910 of FIG. 9, or authentication service 1010 of FIGS. 10A and 10B.

The session initiator identifier 1220D or 1230D refers to an identity identifier that uniquely identifies the session initiator. The session acceptor identity identifier 1220E or 1230E refers to an identity identifier that uniquely identifies the session acceptor.

The nonce of the authentication service 1220F or 1230F refers to the nonce (e.g., a single-use random number) provided, for example, by the authentication service in conjunction with the authentication-service challenge during a session establishment procedure, such as described by step 1040*a* of FIG. 10A.

The message authentication code 1220G or 1230G may be a message authentication code (MAC) derived using the session key, the short-term authentication credential of the session initiator or the short-term authentication credential of the session acceptor.

The nonce of the session initiator 1220H refers to the nonce (e.g., a single-use random number) provided, for example, by the session initiator in conjunction with the session establishment response message exchange of the session establishment procedure, such as described by step 1090*sa* of FIG. 10B.

Figure 13:
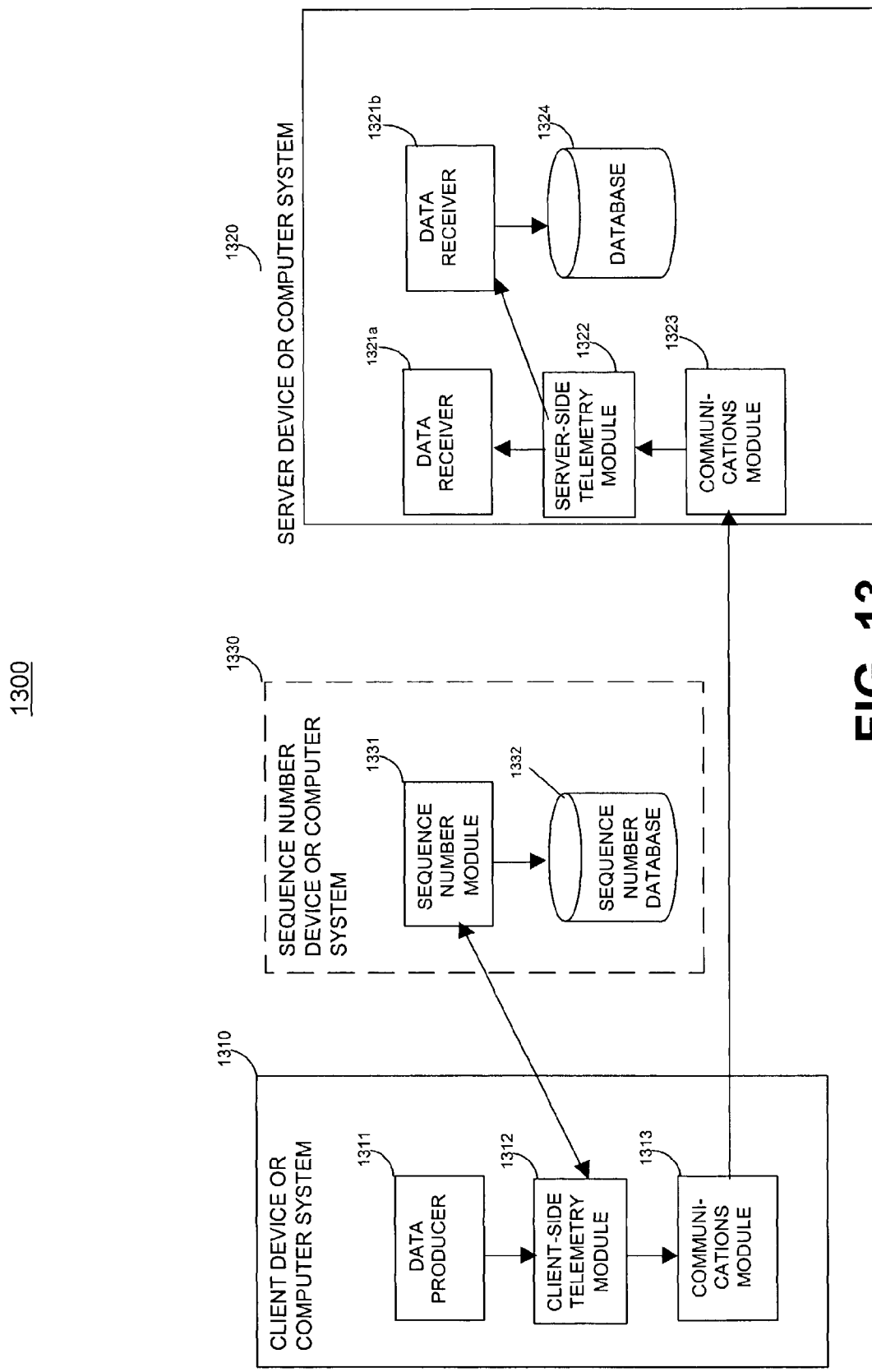
FIG. 13 is a block diagram depicting an architecture for sending telemetry data from a data producer to one or more data receivers.

FIG. 13 illustrates an architecture 1300 for sending telemetry data from a data producer 1311 to one or more data receivers 1321*a* and 1321*b*. The data producer 1311 resides within a device or computer system 1310 that includes the data producer 1311, a client-side telemetry module 1312, and a communications module 1313. In one implementation, the communications module 1313 may be an identity-based communications layer, such as the ICL endpoint library 305 of FIG. 3, the initiating ICL software 412 of FIG. 4, or the initiating ICL software 612 of FIG. 6. The data receivers 1321*a* and 1321*b* reside on a device or computer system 1320 that includes the data receivers 1321*a* and 1321*b*, a server-side telemetry module 1322, and a communications module 1323. In one implementation, the communications module 1323 may be an identity-based communications layer such as the ICL endpoint library 305 of FIG. 3, the accepting ICL software 422 of FIG. 4, or the accepting ICL software 622 of FIG. 6.

Telemetry data may consist of a series of data elements defined by the data producer 1311. The series of data elements may be homogeneous such that each successive data element has the same internal structure, or the series of data elements may be heterogeneous such that each successive data element may have a different internal structure. A data producer may create more than one series of data elements, with each series having a meaning that is independent of other series and being expected to be used independently of the other series. For example, one series of data elements may represent temperature and humidity readings taken at regular intervals from a weather sensor, while a second series of data elements may represent events that are generated each time a button on a device is pressed.

A data producer 1311 uses the client-side telemetry module 1312 to send data elements to data receivers 1321a and 1321b. Typically, the data receivers 1321a and 1321b have expressed an interest in receiving telemetry data from the data producer 1311. In one implementation, a data receiver 1321a may register with the server-side telemetry module 1322 to indicate interest in receiving telemetry data from a particular data producer and receiving a particular series of data elements. In another implementation, a configuration file may be provided to the server-side telemetry module 1322 to specify the particular data receivers 1321a and 1321b that are to receive the particular series of data elements. In some implementations, a data receiver may receive multiple series of data elements from the same data producer, may receive multiple series of data elements from different data producers, and/or may receive only a single series of data elements. In other implementations, a data receiver may be receiving only one series of data elements, or a data receiver may receive multiple series of data elements from a single data producer.

The data producer 1311 creates and provides one or more series of data elements to the client-side telemetry module 1312. A data element produced by the data producer 1311 also may be referred to as a client data element. The client-side telemetry module 1312 receives the one or more series of client data elements. The client-side telemetry module 1312 may associate additional information with each client data element. The combination of the client data element and the associated information created by the client-side telemetry module 1321 may be referred to as a telemetry data element.

Examples of additional information that the client-side telemetry module 1321 may associate with each telemetry data element includes an identity identifier associated with the data producer 1311, a series identifier that is unique across all data series produced by the data producer 1311, and/or a data element identifier that is unique across all data elements produced by the data producer 1311 within a particular data element series. A data element produced by the data producer 1311 may be referred to as a client data element, and the combination of the client data element and the associated information created by the client-side telemetry module 1321 may be referred to as a telemetry data element.

A key issue in sending and using telemetry data is the construction of the data element identifier that the client-side telemetry module 1321 associates with each data element. A data element with the properties of uniqueness, monotonicity, and/or adjacency may be advantageous. The property of uniqueness refers to a data element identifier that is unique across all data elements produced by the data producer 1311 within a particular data element series. The property of monotonicity refers to the sufficiency of a data element identifiers to determine the order in which data elements were created by the data producer 1311. The property of adjacency refers to the ability to determine that a data element is missing in the series. For example, a missing data element may be detected through the identification of a gap in the series of received data element identifiers. It may further be desirable for these properties to be preserved even when the computer system or device 1310 powers down or crashes in between the generation of successive data elements within a series.

An integer sequence number that is incremented by one for each successive data element is an example of a data element identifier having all three properties of uniqueness, monotonicity, and adjacency. This may be accomplished, for example, when the sequence number that was most recently assigned to a data element (e.g., the last sequence number assigned to a data element) is recorded in a persistent storage that is capable of surviving the powering down or crash of the device or computer system 1310. The recording of the most recently assigned sequence number may help ensure the uniqueness, monotonicity, and adjacency of data element identifiers in the event that the computer system or device 1310 powers down or crashes in between the generation of successive data elements.

Another example of a data identifier is a pair of integers, with the first integer being a generation number and the second integer being a sequence number. Each time the device or computer system 1310 powers down or crashes, the generation number is incremented by one and the sequence number is reset to zero. Between power-down or crash events, the sequence number is incremented by one each time a new data element is produced. This kind of data identifier has the properties of uniqueness and monotonicity, and has a limited form of adjacency in that missing elements may be detected everywhere except immediately prior to a power down or crash. This kind of data identifier may require less frequent access to persistent storage than a single integer sequence number data identifier. This may be, for example, because only the generation number may need to be recorded in persistent storage, and the generation number changes only after a power-down or crash event rather than after the generation of each successive data element.

In one implementation, the persistent storage for sequence numbers and/or generation numbers is provided by a third device or computer system 1330 which hosts a sequence number module 1331 and a sequence number database 1332. In this implementation, the client-side telemetry module 1312 sends an update request to the sequence number module 1331 when the stored sequence number or generation number needs to be updated, and the sequence number module 1331 updates the sequence number database 1332 accordingly. When the client-side telemetry module powers up or recovers from a crash, the client-side telemetry module sends a request to the sequence number module 1331 to retrieve the most recent value of the sequence number or generation number. When there are many data producers 1311, the sequence number database 1332 may be organized to store sequence numbers and/or generation numbers according to the identity identifier of each data producer 1311.

In another implementation, the persistent storage for sequence numbers and/or generation numbers is implemented by a non-volatile memory contained within the device or computer system 1310 itself.

The client-side telemetry module 1312 then uses a communications module 1313 to communicate the telemetry data elements to a corresponding communications module 1323 residing on the computer system 1320 that hosts data receivers 1321a and 1321b.

The communications module 1323 receives the telemetry data elements and passes the received telemetry data elements to a server-side telemetry module 1322.

The server-side telemetry module 1322 may perform checks on the incoming telemetry data elements to verify that no elements are missing. The server-side telemetry module 1322 also may segregate received telemetry data elements according to the identity of the data producer 1311. The server-side telemetry module 1322 also may segregate the received telemetry data elements into several separate series of data elements produced by the data producer 1311. The server-side telemetry module 1322 determines which of data receivers 1321a and 1321b is to receive each received telemetry data element. The determination of whether data receiver 1321a or 1321b is to receive a given received data element may be made on the basis of the identity of the data producer, and/or the series of data elements to which a received telemetry data element belongs.

The server-side telemetry module 1322 may use the information contained within a telemetry data element to route received data elements to the appropriate data receiver 1321. For example, the server-side telemetry module 1322 may use the identity identifier of the data producer 1311 and/or the series identifier to determine which data receiver 1321 to use. When the data element identifiers have the adjacency property, the server-side telemetry module may also use the data element identifier to detect and report to the data receiver 1321 any missing data in the received sequence of data elements. The server-side telemetry module may also use the data element identifier to detect and correct the presence of duplicates in the received data elements (when the data element identifiers have the uniqueness property), or out-of-order data elements (when the data element identifiers have the monotonicity property).

The server-side telemetry module 1322 then passes the appropriate data elements to the appropriate data receiver 1321a or 1321b.

The data receiver 1321a or 1321b may be one of several types. For example, a data receiver 1321a may act to process each data element as soon as the date element is received, and may do so by performing some application-specific task.

As another example, a data receiver 1321b may act to store received data elements into a database or other type of data store 1324. The database 1324 may be, for example, a relational database, an object-oriented database, a collection of files (such as extensible mark-up language (XML) files), or another type of data collection.

When a data receiver 1321b stores received data elements into a relational database, the data receiver 1321b may store additional information in the telemetry data element. For example, the data receiver 1321b may store the identity identifier of the data producer 1311, the series identifier, and/or the data element identifier along with the data element. When the data element identifier has the uniqueness property, the data element identifier together with the data producer identity identifier and the series identifier may constitute a unique primary key for the data elements within the database.

When data elements and the identity identifier of the data producer 1311 are stored in a database 1324, the identity identifier may be used to associate additional information with the stored data elements. For example, an application reading data from the database 1324 may use the stored identity identifier to access additional information about the identity of the data producer 1311. Additional information about the identity of the data producer may be obtained, for example, from an identity database such as the identity database 340 in FIG. 3, including attributes, version, and other information.

In another example, when the identity identifier of the data producer 1311 is a composite identity, an application that receives telemetry data may be able to access information about the circumstances in which the data producer 1311 produced the data. For example, when the identity identifier of the data producer 1311 is a composite identity associated with the identity identifier of a specific user and the identity identifier of a specific device, and the data was produced through the activities of the user when logged into the device, an application that receives the telemetry data may use the identity identifier of the data producer 1311 to determine the associated identities of the device and the user. This may allow, for example, an application to analyze data on the basis of the particular user and the particular device that produced the data.

When the communications modules 1313 and 1323 are implemented as identity-based communications layers, such as the ICL endpoint library 305 of FIG. 3, the initiating ICL software 412 of FIG. 4, or the initiating ICL software 612 of FIG. 6, the identity identifier of the data producer 1311 may be the same identity identifier that is used in conjunction with ICL authentication and session establishment. When that is the case, an application that receives telemetry data may benefit from the additional assurance that the identity identifier received with telemetry data is authentic.

Figure 14:
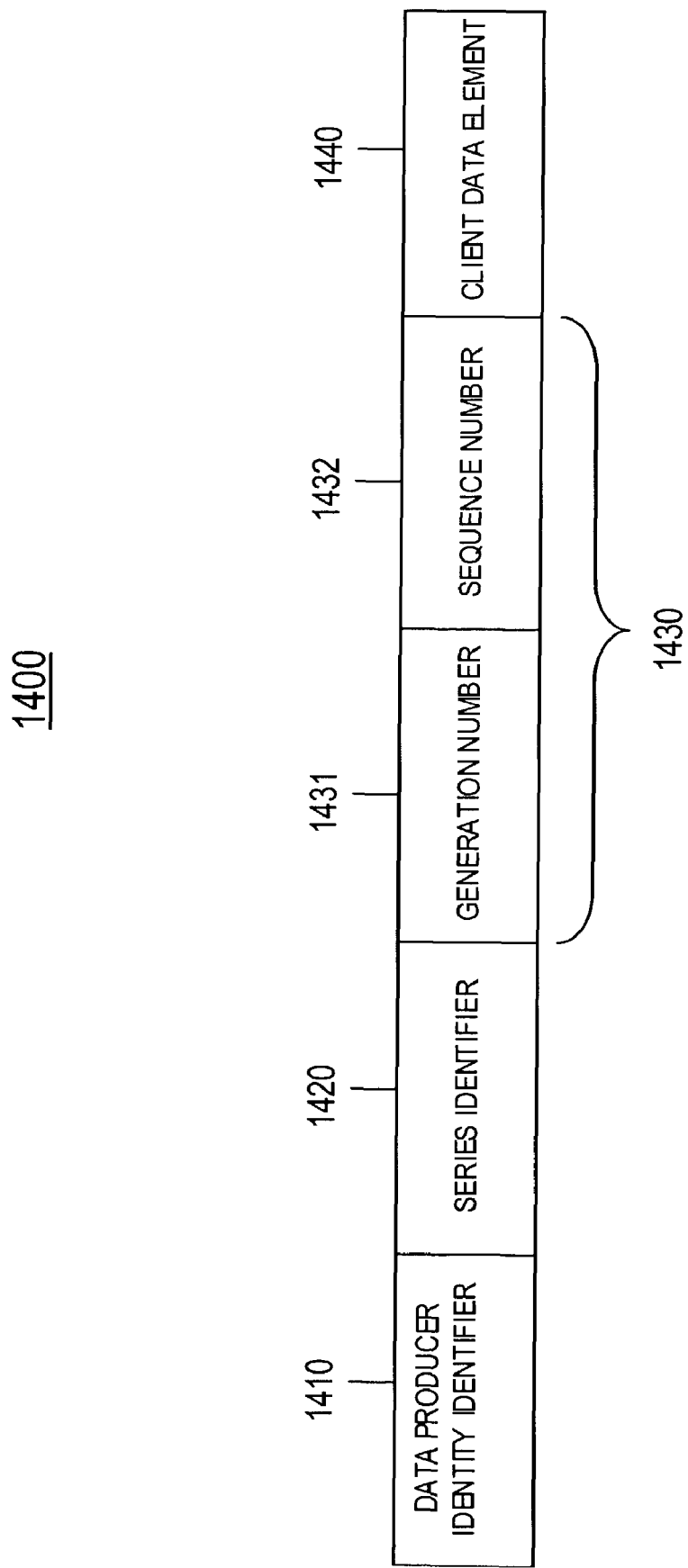
FIG. 14 is a block diagram illustrating a data structure for a telemetry data element.

FIG. 14 illustrates an example data structure 1400 for a telemetry data element. The telemetry data element 1400 comprises a data producer identity identifier 1410, a series identifier 1420, a data element identifier 1430, and a client data element 1440.

The data producer identity identifier 1410 identifies the data producer that produced the telemetry data element. The series identifier 1420 identifies the series of data elements to which the telemetry data element belongs.

The data element identifier 1430 uniquely identifies the data element through the use of a generation number 1431 and a sequence number 1432. The generation number 1431 identifies the generation or period in which the device or computer system that produced the data was active. The generation number 1431 may be an integer that is incremented by one each time the data producer 1311 powers up or recovers from a crash. The sequence number 1432 identifies a particular data element within the generation represented by the generation number 1431. The sequence number 1432 may be an integer that is reset to zero each time the data producer 1311 powers up or recovers from a crash and that is incremented by one each time a new data element is generated within a given data series.

The client data element 1440 comprises producer-defined data that is produced by the data producer.

A number of implementations have been described. Nevertheless, it will be understood that various modifications may be made. Accordingly, other implementations are within the scope of the following claims.

What is claimed is:

1. A computer-implemented method for communicating between two endpoints connected to a network, the method comprising having a first endpoint use a global address of a second endpoint to communicate with the second endpoint, wherein:

the global address specifies a protocol, a network identifier, and an address meaningful for the combination of the protocol and a network identified by the network identifier, an application of the first endpoint sends messages directed to the second endpoint through an identity-based communication layer, implemented on a computing device, that is situated between a network layer and an application layer, the messages being independent of the protocol, the identity-based communication layer transmits the messages to the second endpoint using the protocol, the network, and the address specified by the global address, wherein the first endpoint comprises a first physical device and the second endpoint comprises a second physical device;

the method further comprising determining the global address of the second endpoint by using a unique identity identifier associated with the second endpoint;

wherein the unique identity identifier specifies a realm and a unique identifier that identifies the second endpoint within the realm, and the combination of the realm and the unique identifier uniquely identifies the identity.

2. The computer-implemented method of claim 1 wherein the global address may be different each time a session is initiated with the second endpoint.

3. The computer-implemented method of claim 1 wherein the unique identity identifier comprises an identity identifier for a composite identity, the composite identity being associated with two or more other identity identifiers.

4. The computer-implemented method of claim 3 wherein the composite identity is associated with an authentication credential.

5. The computer-implemented method of claim 3 further comprising creating the composite identity only when each of the two or more other identity identifiers associated with the composite identity have been authenticated.

6. The computer-implemented method of claim 3 wherein at least one of the two or more other identity identifiers associated with the composite identity comprises an identity identifier for another composite identity.

7. The computer-implemented method of claim 1 wherein determining the global address is accomplished through the use of a presence and availability service that provides the global address in response to a received identity identifier.

8. The computer-implemented method of claim 7 further comprising having the second endpoint announce the global address of the second endpoint through the use of the presence and availability service.

9. The computer-implemented method of claim 8 further comprising:
    determining whether the second endpoint is permitted to announce the global address;
    and only when the second endpoint is permitted to announce the global address, having the second endpoint announce the global address through the use of the presence and availability service.

10. The computer-implemented method of claim 9 wherein determining whether the second endpoint is permitted to announce the global address is based on the identity identifier of the second endpoint.

11. The computer-implemented method of claim 9 wherein determining whether the second endpoint is permitted to announce the global address is performed by a policy service.

12. The computer-implemented method of claim 8 wherein the global address the presence and availability service provides in response to an identity identifier is the global address most recently announced by the endpoint associated with that identity identifier.

13. The computer-implemented method of claim 1 wherein determining the global address of the second endpoint occurs during an authentication procedure involving the first endpoint, the second endpoint and a third entity.

14. The computer-implemented method of claim 13 further comprising:
    determining whether a communication session between the second endpoint and a first endpoint is permitted; and
    completing the authentication procedure only when the communication session is permitted.

15. The computer-implemented method of claim 14 wherein determining whether the communication session is permitted is based on the identity identifier of at least one of the second endpoint and the first endpoint.

16. The computer-implemented method of claim 14 wherein determining whether the communication session is permitted is performed by a policy service.

17. The computer-implemented method of claim 1 further comprising encrypting messages exchanged in the communication session between the first endpoint and the second endpoint.

18. The computer-implemented method of claim 17 further comprising having a policy service determine whether to encrypt messages exchanged in the communication session between the first endpoint and the second endpoint.

19. The computer-implemented method of claim 17 wherein determining whether to encrypt messages occurs when the first endpoint initiates a communication session with the second endpoint.

20. The computer-implemented method of claim 17 wherein determining whether to encrypt messages is based on the identity identifier of at least one of the first endpoint and the second endpoint.

21. The computer-implemented method of claim 17 wherein determining whether to encrypt messages occurs during an authentication procedure involving the first endpoint, the second endpoint, and a third entity.

22. The computer-implemented method of claim 1 further comprising applying an integrity check to a message exchanged in the communication session between the first endpoint and the second endpoint.

23. The computer-implemented method of claim 22 wherein the integrity check employs a message authentication code.

24. The computer-implemented method of claim 22 further comprising having a policy service determine whether to apply integrity checks to messages exchanged in the communication session between the first endpoint and the second endpoint.

25. The computer-implemented method of claim 22 wherein determining whether to apply data integrity checks occurs when the first endpoint initiates a communication session with the second endpoint.

26. The computer-implemented method of claim 25 wherein determining whether to apply data integrity checks is based on the identity identifier of at least one of the first endpoint and the second endpoint.

27. The computer-implemented method of claim 25 wherein determining whether to apply data integrity checks occurs during an authentication procedure involving the first endpoint, the second endpoint, and a third entity.

28. The computer-implemented method of claim 1 wherein:
    the first endpoint is connected to a first network,
    the second endpoint is connected to a second network, and
    a relay is used to connect the first network and the second network.

29. The computer-implemented method of claim 1 wherein the protocol comprises a message framing protocol using the transmission control protocol.

30. The computer-implemented method of claim 29 wherein the address meaningful for the combination of the protocol and the network identified by the network identifier comprises an Internet Protocol address and a transmission control protocol port number.

31. The computer-implemented method of claim 29 wherein the address meaningful for the combination of the protocol and the network identified by the network identifier comprises an Internet Protocol domain name and a transmission control protocol port number.

32. The computer-implemented method of claim 1 wherein the protocol is the Hypertext Transfer Protocol.

33. The computer-implemented method of claim 32 wherein the address meaningful for the combination of the protocol and the network identified by the network identifier comprises a uniform resource locator.

34. The computer-implemented method of claim 1 wherein the identity identifier of the second endpoint is associated with more than one global address, the method further comprising selecting a global address for the second endpoint from the more than one global address associated with the identity identifier of the second endpoint to use for communicating between the first endpoint and the second endpoint.

35. A computer-implemented method for communicating between two endpoints connected to a network, the computer-implemented method comprising:
having an application of a first endpoint provide to a global-address-based communication layer, implemented on a computing device, (1) a message destined for a second endpoint, and (2) a global address of the second endpoint, wherein the global address specifies a protocol, a network identifier, and an address meaningful for the combination of the protocol and a network identified by the network identifier;
having the global-address-based communication layer select an appropriate networking layer;
having the global-address-based communication layer provide to the selected networking layer (1) the message destined for the second endpoint and (2) the address meaningful for the combination of the protocol and network identified by the network identifier;
having the selected networking layer send the message to the second endpoint,
wherein the first endpoint comprises a first physical device and the second endpoint comprises a second physical device; and
determining the global address of the second endpoint by using a unique identity identifier associated with the second endpoint;
wherein the unique identity identifier specifies a realm and a unique identifier that identifies the second endpoint within the realm, and the combination of the realm and the unique identifier uniquely identifies the identity.

36. The computer-implemented method of claim 35 wherein the selected networking layer transmits the message using the protocol specified by the global address of the second endpoint.

37. The computer-implemented method of claim 35 further comprising:
having the application provide to an identity-based communication layer (1) a message destined for the second endpoint and (2) an identity identifier associated with the second endpoint;
having the identity-based communication layer use a presence and availability service to determine the global address of the second endpoint using the identity identifier associated with the second endpoint; and
having the identity-based communication layer provide to the global-address-based communications layer (1) the message destined for the second endpoint and (2) the global address of the second endpoint.

38. The computer-implemented method of claim 37 wherein using the presence and availability service to determine the global address of the second endpoint comprises:
sending to the presence and availability service the identity identifier associated with the second endpoint; and
receiving from the presence and availability service the global address associated with the second endpoint.

39. The computer-implemented method of claim 35 further comprising:
having a networking layer of the second endpoint receive the message and
providing the message to a global-address-based communication layer of the second endpoint;
and having the global-address-based communication layer of the second endpoint provide the message to an application layer of the second endpoint.

40. The computer-implemented method of claim 39 further wherein providing the message to the application layer of the second endpoint comprises:
having the global-address-based communication layer of the second endpoint provide the message to an identity-based communication layer of the second endpoint; and
having the identity-based communication layer of the second endpoint provide the message to the application layer of the second endpoint.

41. A non-transitory computer-readable medium having embodied thereon a computer program configured to cause a processor to communicate between two endpoints connected to a network,
the non-transitory computer-readable medium comprising one or more code segments configured to cause the processor to:
have a first endpoint use a global address of a second endpoint to communicate with the second endpoint,
have the global address specify a protocol, a network identifier, and an address meaningful for the combination of the protocol and a network identified by the network identifier,
have an application of the first endpoint send messages directed to the second endpoint through an identity based communication layer that is situated between a network layer and an application layer, the messages being independent of the protocol, and have the identity-based communication layer transmit the messages to the second endpoint using the protocol, the network, and the address specified by the global address,
wherein the first endpoint comprises a first physical device and the second endpoint comprises a second physical device; and
determine the global address of the second endpoint by using a unique identity identifier associated with the second endpoint;
wherein the unique identity identifier specifies a realm and a unique identifier that identifies the second endpoint within the realm, and the combination of the realm and the unique identifier uniquely identifies the identity.

42. The non-transitory computer-readable medium of claim 41 wherein the global address may be different each time a session is initiated with the second endpoint.

43. The non-transitory computer-readable medium of claim 41 wherein the identity identifier comprises an identity identifier for a composite identity, the composite identity being associated with two or more other identity identifiers.

44. The non-transitory computer-readable medium of claim 41 wherein:
the first endpoint is connected to a first network,
the second endpoint is connected to a second network, and
a relay is used to connect the first network and the second network.

45. The non-transitory computer-readable medium of claim 41 wherein:
the identity identifier of the second endpoint is associated with more than one global address, and
the one or more code segments are further configured to cause the processor to select a global address for the second endpoint from the more than one global address associated with the identity identifier of the second endpoint to use for communicating between the first endpoint and the second endpoint.

46. A non-transitory computer-readable medium having embodied thereon a computer program configured to cause a processor to communicate between two endpoints connected to a network, the non-transitory computer-readable medium comprising one or more code segments configured to cause the processor to:
have an application of a first endpoint provide to a global-address-based communication layer (1) a message destined for a second endpoint, and (2) a global address of the second endpoint, wherein the global address specifies a protocol, a network identifier, and an address meaningful for the combination of the protocol and a network identified by the network identifier;
have the global-address-based communication layer select an appropriate networking layer;
have the global-address-based communication layer provide to the selected networking layer (1) the message destined for the second endpoint and (2) the address meaningful for the combination of the protocol and network identified by the network identifier; and have the selected networking layer send the message to the second endpoint,
wherein the first endpoint comprises a first physical device and the second endpoint comprises a second physical device: and
determine the global address of the second endpoint by using a unique identity identifier associated with the second endpoint;
wherein the unique identity identifier specifies a realm and a unique identifier that identifies the second endpoint within the realm, and the combination of the realm and the unique identifier uniquely identifies the identity.

47. The non-transitory computer-readable medium of claim 46 wherein the selected networking layer transmits the message using the protocol specified by the global address of the second endpoint.

48. The non-transitory computer-readable medium of claim 46 wherein the one or more code segments are further configured to cause the processor to:
have the application provide to an identity-based communication layer (1) a message destined for the second endpoint and (2) an identity identifier associated with the second endpoint;
have the identity-based communication layer use a presence and availability service to determine the global address of the second endpoint using the identity identifier associated with the second endpoint; and
have the identity-based communication layer provide to the global-address-based communications layer (1) the message destined for the second endpoint and (2) the global address of the second endpoint.

49. A system for communicating between two endpoints connected to a network, the system comprising a processor connected to a physical storage device and one or more input/output physical devices, wherein the processor is configured to:
have a first endpoint use a global address of a second endpoint to communicate with the second endpoint,
have the global address specify a protocol, a network identifier, and an address meaningful for the combination of the protocol and a network identified by the network identifier, have an application of the first endpoint send messages directed to the second endpoint through an identity based communication layer that is situated between a network layer and an application layer, the messages being independent of the protocol, and have the identity-based communication layer transmit the messages to the second endpoint using the protocol, the network, and the address specified by the global address,
wherein the first endpoint comprises a first physical device and the second endpoint comprises a second physical device; and
determine the global address of the second endpoint by using a unique identity identifier associated with the second endpoint;
wherein the unique identity identifier specifies a realm and a unique identifier that identifies the second endpoint within the realm, and the combination of the realm and the unique identifier uniquely identifies the identity.

50. The system of claim 49 wherein the global address may be different each time a session is initiated with the second endpoint.

51. The system of claim 49 wherein the identity identifier comprises an identity identifier for a composite identity, the composite identity being associated with two or more other identity identifiers.

52. The system of claim 49 wherein:
the first endpoint is connected to a first network,
the second endpoint is connected to a second network, and
a relay is used to connect the first network and the second network.

53. The system of claim 49 wherein:
the identity identifier of the second endpoint is associated with more than one global address, and the processor is further configured to select a global address for the second endpoint from the more than one global address associated with the identity identifier of the second endpoint to use for communicating between the first endpoint and the second endpoint.

54. A system for communicating between two endpoints connected to a network, the system comprising a processor connected to a physical storage device and one or more physical input/output devices, wherein the processor is configured to:
have an application of a first endpoint provide to a global-address-based communication layer (1) a message destined for a second endpoint, and (2) a global address of the second endpoint, wherein the global address specifies a protocol, a network identifier, and an address meaningful for the combination of the protocol and a network identified by the network identifier have the global-address-based communication layer select an appropriate networking layer;

have the global-address-based communication layer provide to the selected networking layer (1) the message destined for the second endpoint and (2) the address meaningful for the combination of the protocol and network identified by the network identifier;

have the selected networking layer send the message to the second endpoint, wherein the first endpoint comprises a first physical device and the second endpoint comprises a second physical device; and determine the global address of the second endpoint by using a unique identity identifier associated with the second endpoint;

wherein the unique identity identifier specifies a realm and a unique identifier that identifies the second endpoint within the realm, and the combination of the realm and the unique identifier uniquely identifies the identity.

55. The system of claim 54 wherein the selected networking layer transmits the message using the protocol specified by the global address of the second endpoint.

56. The system of claim 54 wherein the processor is further configured to:

have the application provide to an identity-based communication layer (1) a message destined for the second endpoint and (2) an identity identifier associated with the second endpoint;

have the identity-based communication layer use a presence and availability service to determine the global address of the second endpoint using the identity identifier associated with the second endpoint; and have the identity-based communication layer provide to the global-address-based communications layer (1) the message destined for the second endpoint and (2) the global address of the second endpoint.

* * * * *

UNITED STATES PATENT AND TRADEMARK OFFICE
CERTIFICATE OF CORRECTION

| | | |
|---|---|---|
| PATENT NO. | : 7,962,655 B2 | Page 1 of 1 |
| APPLICATION NO. | : 10/372399 | |
| DATED | : June 14, 2011 | |
| INVENTOR(S) | : Birger et al. | |

It is certified that error appears in the above-identified patent and that said Letters Patent is hereby corrected as shown below:

IN THE DRAWINGS:

On sheet 13 of 15, in figure 12, reference numeral 1220D, line 2, delete "IDENTIER" and insert -- IDENTIFIER --, therefor.

On sheet 13 of 15, in figure 12, reference numeral 1230D, line 2, delete "IDENTIER" and insert -- IDENTIFIER --, therefor.

In column 2, line 48, delete "nay" and insert -- may --, therefor.

In column 9, line 43, delete "applications." and insert -- applications --, therefor.

In column 14, line 66, delete "(step 450 in)." and insert -- (step 450in). --, therefor.

In column 15, line 13, delete "(step 470 in)," and insert -- (step 470in), --, therefor.

In column 15, line 20, delete "identity 5" and insert -- identity --, therefor.

In column 28, line 29, delete "(step 8611)," and insert -- (step 861i), --, therefor.

In column 34, line 20, delete "shot-term 10" and insert -- short-term --, therefor.

In column 51, line 45, in Claim 46, delete "device:" and insert -- device; --, therefor.

Signed and Sealed this
Eighth Day of November, 2011

David J. Kappos
*Director of the United States Patent and Trademark Office*